INVENTOR
FRANK B. SIKORSKI
BY
Bernard E. Franz
ATTY.

June 27, 1967 F. B. SIKORSKI 3,328,535

CLASS OF SERVICE COMMUNICATION SWITCHING SYSTEM

Original Filed Aug. 27, 1963 13 Sheets-Sheet 2

June 27, 1967 F. B. SIKORSKI 3,328,535

CLASS OF SERVICE COMMUNICATION SWITCHING SYSTEM

Original Filed Aug. 27, 1963 13 Sheets-Sheet 6

June 27, 1967 F. B. SIKORSKI 3,328,535

CLASS OF SERVICE COMMUNICATION SWITCHING SYSTEM

Original Filed Aug. 27, 1963 13 Sheets-Sheet 9

3,328,535
CLASS OF SERVICE COMMUNICATION SWITCHING SYSTEM

Frank B. Sikorski, Des Plaines, Ill., assignor to Automatic Electric Laboratories, Inc., Northlake, Ill., a corporation of Delaware Original application Aug. 27, 1963, Ser. No. 304,826. Divided and this application Dec. 1, 1966, Ser. No. 598,463
8 Claims. (Cl. 179—18)

ABSTRACT OF THE DISCLOSURE

The disclosure relates to a switching network and marker used in a communication switching system. The network comprises a plurality of coordinate matrices with reed relay crosspoint switching devices. The marker is a combination of reed relays and electronic scanners for finding a path through the network and establishing a connection. The same network and marker are used for originating and terminating calls.

This is a division of my application Ser. No. 304,826 filed Aug. 27, 1963 and now abandoned. The drawings and the specification following the brief description of the drawings in the original application is identical to that of an application by W. R. Wedmore for a Marker For A Communication Switching Network, Ser. No. 804,892, filed Aug. 27, 1963, now Patent No. 3,293,368, which is made a part hereof as though fully set forth, and may be referred to for additional details of the system.

This invention relates to a communication switching marker selection arrangement, and more particularly to an arrangement for supplying the class of service of a calling line or trunk to common equipment.

U.S. Patent No. 3,170,041 by K. K. Spellnes describes a Communication Switching System having marker controlled crosspoint switching networks, and common control equipment comprising register-senders and translators. Each register-sender group includes electronic apparatus shared on a time division multiplex basis, with a ferrite core array used in a recirculating arrangement. The system provides full translation on every call from the directory number to an equipment location number. Each subscriber in the exchange is identified to the other subscribers by the office code, or one of a number of office codes, of that exchange and by a line directory number. His line is also assigned in that exchange a particular appearance on a set of terminals of the switching equipment. This arrangement permits complete flexibility in the assignment of telephone numbers and terminals on the switching equipment, and eliminates the necessity for a line intermediate distributing frame. Any change of subscriber service is accomplished simply by changing the instructions stored in the translator. The translator preferably uses a magnetic drum. Changes on the drum are made simply by keying instructions in a control console. The translator equipment is arranged to be accessed from the register-sender groups. The translator assigns itself to a register at various times during dialing, for example at the end of a group of digits representing an office code or other special code.

The switching network comprises local subscriber line groups of 1000 lines each, selector groups, and incoming trunk groups. Each line group provides crosspoint switching matrices for originating connections from calling local subscriber lines to originating junctors which are connected to selector inlets, and also through a register matrix to register junctors; and also provides matrices for terminating connections between terminating junctors and called local subscriber lines, the terminating junctors being accessed directly from selector outlets. In the trunk group incoming trunks are connected directly to selector inlets, and also through a crosspoint switching network to register junctors.

On originating calls, both in the line group from local subscriber calling lines, and in the trunk group from incoming trunks, the marker during the establishment of the connection to a register after identifying the calling line or trunk for use in establishing the connection to the register, also transmits this line or trunk identification by high speed serial binary code to the register for storage. If ticketing is required the line number identification which has been received from the marker as an equipment location number is supplied to the translator to obtain the calling subscriber directory number.

According to the invention, class of service identification during the establishment of originating calls is obtained by providing an arrangement comprising a diode network connected between the pull (operate) conductors at the line terminals and a set of class of service conductors. After the calling line is identified and a route is selected to a register, the marker applies a class of service marking potential through the relay tree to the pull conductor at the line terminal, which potential is applied through the forward conducting direction of the diodes in series to one or more of the class of service conductors. These conductors are connected to a sending arrangement along with identification conductors from the line identifier apparatus, and transmitted to the register for storage. The relay tree for applying this class of service marking potential is the same relay tree which is subsequently used to apply the operate marking potential to the pull conductor at the line terminal to establish a connection.

A switching network is covered by Patent No. 3,275,752 for a Communication Switching System, by M. H. Esperseth et al. A Patent No. 3,211,837 by L. Bruglemans covers a Line Identifier Arrangement for a Communications Switching System. The line identifier of the Bruglemans patent makes use of the switching network described in the Esperseth et al. patent, for identifying the calling line on originating calls. This line identifier includes the relay tree used to apply the marking potentials to the pull conductor at the line terminal. It is also used to supply the identification information which is sent with the class of service of the calling line to the register.

This system is arranged so that the same terminating junctors and switching network matrices which are used for ordinary terminating calls to local lines, are also used for special calls such as wire chief or verification calls to local subscriber lines.

According to another feature of the invention an arrangement is provided for disconnecting the potential (ground potential) which is supplied in common to the cutoff relay contacts. Thus during the special call if the marker finds the called line busy a device such as a flip-flop is set to record this fact, and the output thereof is used to cause the potential to be removed from the cutoff relay contacts so that the marker may complete the connection to that line.

The above-mentioned and other objects and features of this invention and the manner of attaining them will become more apparent, and the invention itself will be best understood, by reference to the following description of an embodiment of the invention taken in conjunction with the accompanying drawings comprising FIGS. 1 to 14 wherein:

FIG. 1 comprises a block diagram of one line group for a telephone switching exchange showing a trunking diagram of the switching network, and a diagram of a marker;

FIG. 2 is a block diagram of the exchange;

FIGS. 3–6 comprise a schematic and block diagram of a line group and line group marker;

FIG. 7 is a diagram of a register-sender group, translator, and group selector;

FIGS. 8–11 comprise a symbolic block diagram of the marker send-receive circuit;

SYSTEM ORGANIZATION

A system incorporating the invention is described in the following copending applications:

K. K. Spellnes, Communication Switching System, Ser. No. 230,887 filed Oct. 16, 1962, now Patent No. 3,170,041;

M. H. Esperseth et al., Communication Switching System, Ser. No. 240,497 filed Nov. 28, 1962, now Patent No. 3,275,752;

K. E. Prescher et al., Communication Switching System Common Control, Ser. No. 231,625 filed Oct. 19, 1962, now Patent No. 3,173,994;

L. Bruglemans, Line Identifier Arrangement for a Communication Switching System, Ser. No. 231,425 filed Oct. 18, 1962, now Patent No. 3,211,837;

B. Sherstiuk, Sender for Communication Switching System, Ser. No. 280,053 filed May 13, 1963, now Patent No. 3,278,691.

Figure 2:
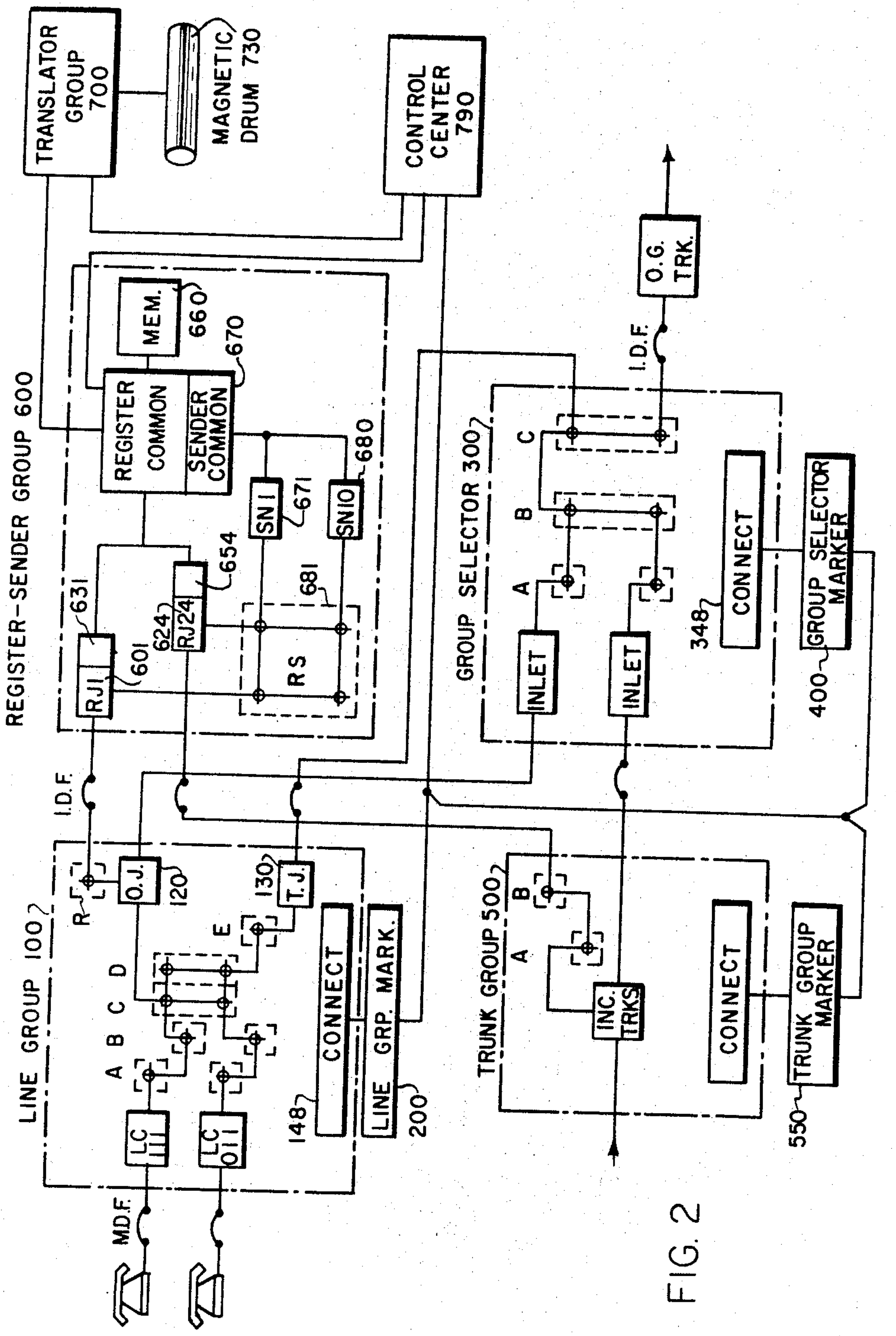

Referring to FIG. 2, the system consists of the line group 100, group selector 300, register-sender group 600, and the translator 700. There is also a trunk group 500 which provides access from incoming trunks to the registers, and a control center 790 which contains a special computer for operation analysis and recording, and program upgrading equipment.

The signaling between the system groups is accomplished by a technique called di-phase. This method employs a phase shift technique for serial sending and receiving of pulses.

TRACING OF A LOCAL CALL

As an introduction to the system operation, a brief description of a typical local call as processed through the system is now presented. The block diagram, FIG. 2, may be followed for tracing the call.

When a subscriber lifts the handset, the line group marker 200 goes into action first by detecting the originating call mark, identifying the calling line, and selecting an idle register junctor within the register-sender. A path is then temporarily established from the calling telephone to the register junctor via the A, B, C, and R matrices, and the subscriber receives dial tone. The dialed digits are stored temporarily, coded, and processing is continued as these digits are passed to the translator 700, analyzed for type of incoming call, and instructions are selected from the drum memory 730 and returned to the register-sender 600 to guide further handling of the call. Upon receipt of the remaining digits, the translator 700 returns switching instructions corresponding to the called number as stored in the drum memory 730. The instructions are transmitted from the register-sender 600 via one of the senders 671–680 and the originating junctor 120 of the originating line group to the group selector 300. In the group selector 300, the instructions are analyzed by the marker 400, an idle terminating junctor 130 in the terminating line group is located, and a path established to that line group via A, B, and C matrices of the group selector. The remaining instructions are followed by the line group marker to locate the called line terminals, select and seize a path from the terminating junctor through the E, D, B and A matrices to the called line. The terminating junctor establishes ringing, answer supervision, and talking battery for both parties when the call is answered.

Since the system is a common control operation, the markers of the line group and group selector function only to serve the assigned portion of the call processing then release to serve other calls. The register-sender 600 and the translator 700 are functioning on a time division basis and therefore are processing several calls simultaneously. The temporary signaling and control paths are released for further service while only the talking paths are held through the switching matrices and junctors.

THE LINE GROUP

*Line group switching network*

Figure 1:
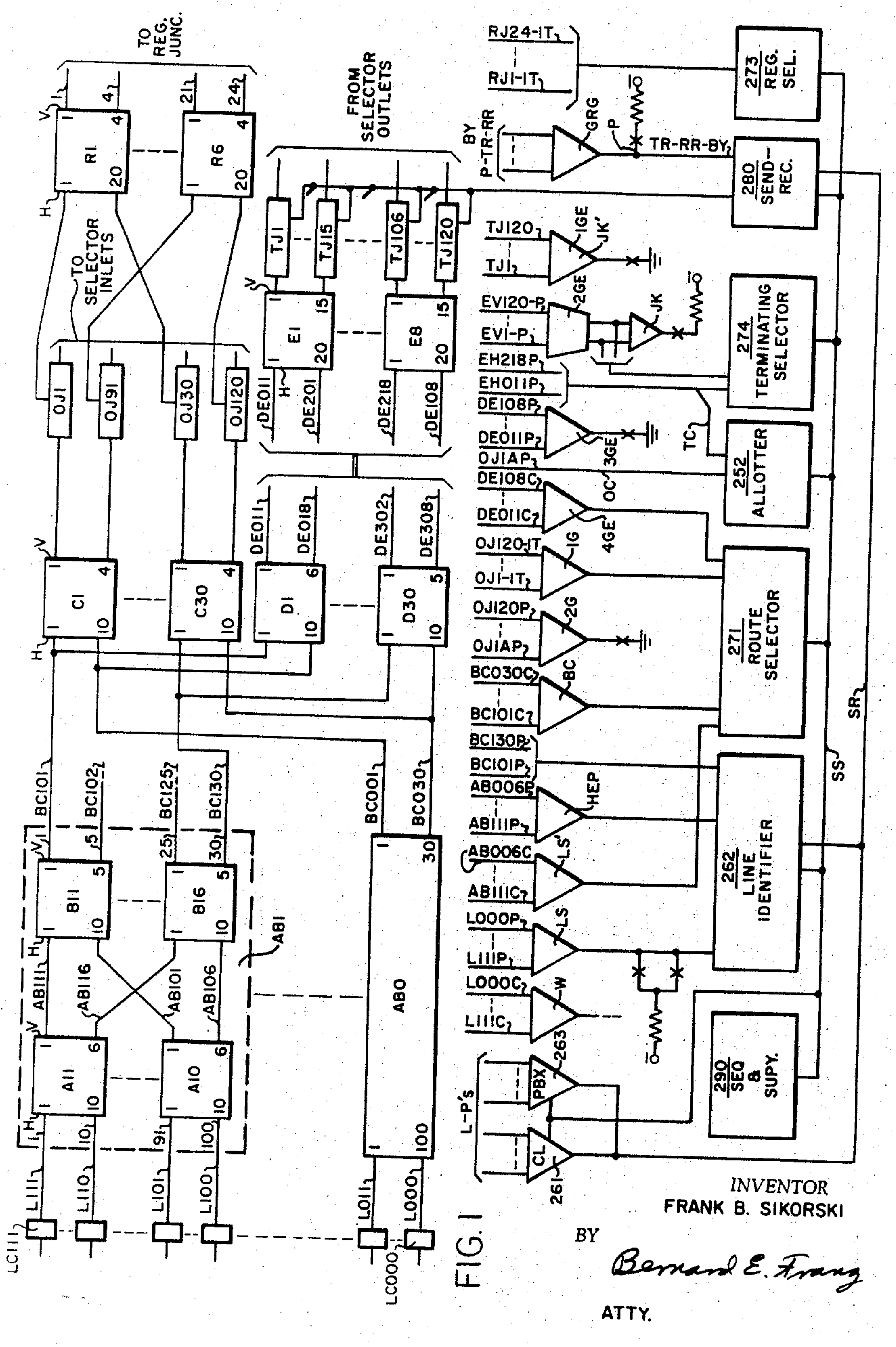

A trunking diagram of one line group switching network is shown on the upper portion of FIG. 1. The network is made up of coordinate crosspoint matrices. This section of the system may be thought of as a large switching unit capable of connecting any one of 1000 lines originating calls to any one of 120 circuits called originating junctors OJ. Likewise, this unit is capable of connecting any one of 120 circuits called terminating junctors TJ and representing incoming calls to any one of the 1000 lines served by this line group. Crosspoint matrices constitute the switching network and provide concentration going outward for originating calls, and expansion going inward for terminating calls. For practical and economic reasons, three stages A, B, and C, make up the outgoing switching stages. Four stages E, D, B and A, make up the incoming switching stages. The 1000 subscriber lines divided into ten groups of 100 each, are located on the main distributing frame and from there are jumpered directly to the A stage. No line intermediate distributing frame is required. The A stage has 600 outlets or links (60 for each of the ten "hundreds" group) appearing as inlets to the B stage. The B stage, in turn, has 300 links (30 for each "hundreds" group) appearing as inlets to the C stage. The C stage has 120 links to originating junctors. The originating junctors provide by-paths via the "R" stage to twenty-four registers and also provide access to the inlet circuits 310 of the group selector 300. With this switching configuration, a fully equipped line group is capable of handling a maximum traffic of three unit calls per line in each direction at a grade of service better than .01.

Figure 3:
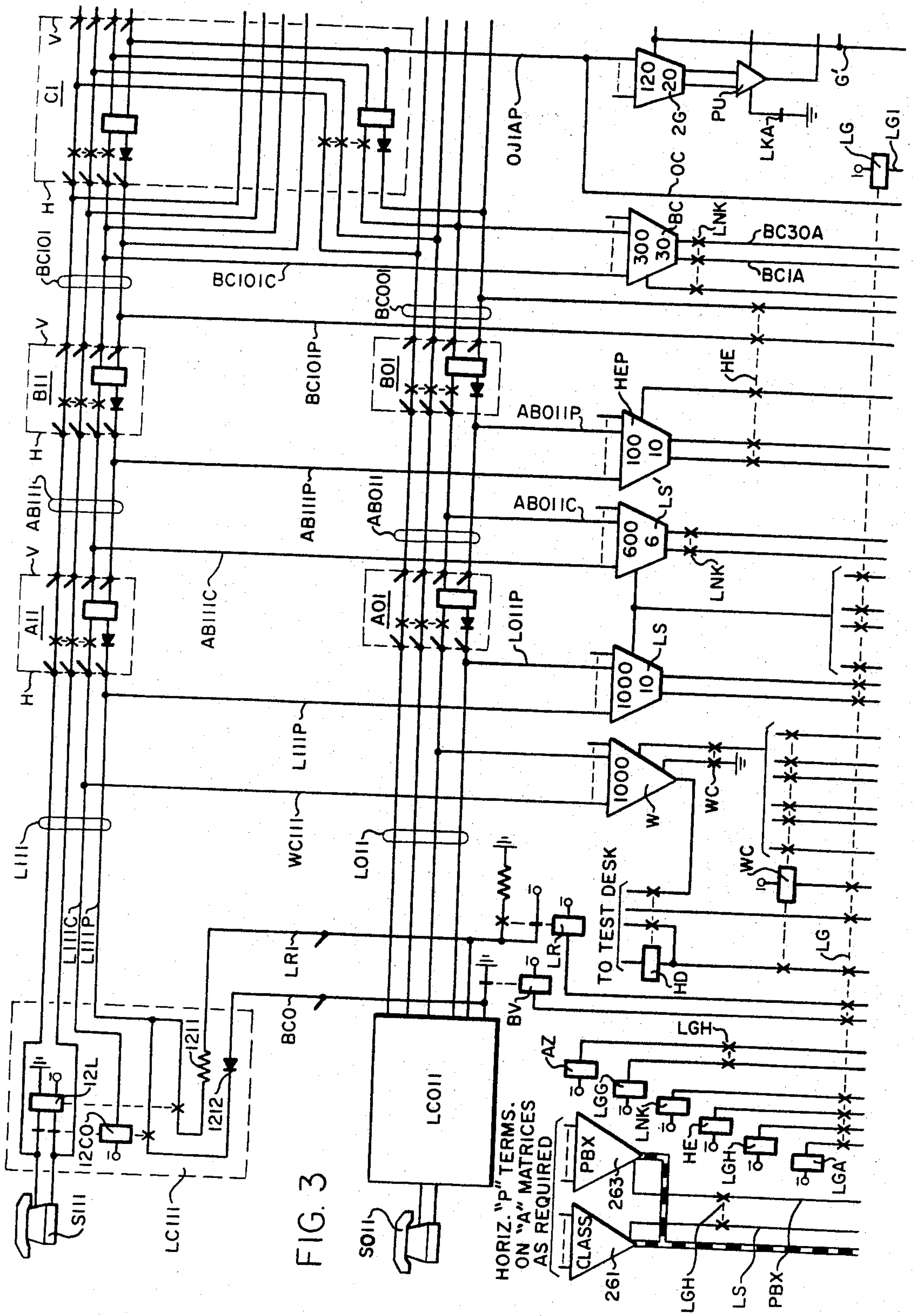
FIGS. 3–7 are to be arranged.
Figure 4:
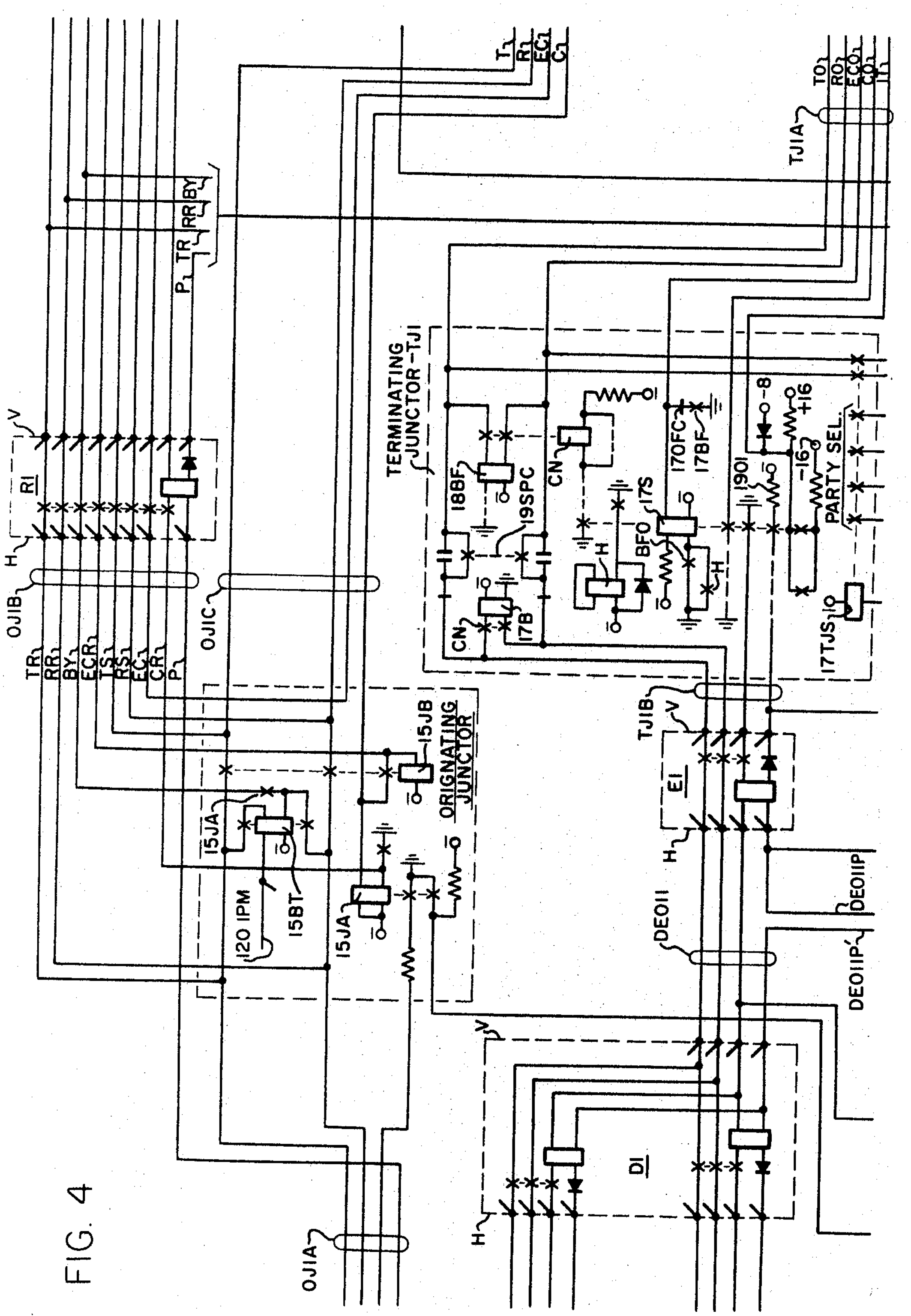

The switching stage matrices are made up crosspoint reed relays, 15,000 for a fully equipped 1000 line group or 15 per line (12 per line for two unit calls per line). As shown in FIGS. 3 and 4, the reed relay coil has two windings, an operate (or pull) winding and a hold winding, and has three contacts. Two of the contacts switch the transmission loop. A third locks the hold winding to the sleeve or "C" lead.

The subscriber's line equipment is similar to a conventional line and cut-off circuit except that reed relays are used and fewer contacts are required. Reed relays were chosen over a static line circuit for simplicity and reliability of operation and for electrical isolation of electronic apparatus from outside plant disturbances.

A maximum of thirty subscribers in a given hundreds group may be engaged in different conversations at one time. One originating and one terminating junctor, two each of A and B crosspoint reed relays, and one each of D, C, and E crosspoint reed relays are held in the line group per conversation. Registers are held only during dialing.

The originating and terminating junctors mentioned earlier are reed relay circuits performing several functions. The originating junctor provides loop splitting facilities for an originating call. Initially, a transmission path is provided from the calling line to register and an additional path is provided from register to group selector for early outpulsing. When the called line is reached, the originating junctor switches the calling line through to the terminating junctor via the group selector. The circuit also provides a busy tone bridge in the event of no link availability.

The terminating junctor performs functions necessary to extend the call to a called subscriber. It provides a path into the line group marker for signaling between the code receiver in the marker and the sender circuit. The circuit provides regular or party line ringing controls, ring back tone, and ring cut-off controls. When line busy is encountered, busy tone is provided at this point. It provides transmission battery feed for both called and calling parties. On test calls and busy verification calls, the junctor removes the battery feeds and switches the calling line metallically through to the called line. For official calls, answer superivsion is disabled within the junctor to prevent charging of the calling end. Thus, it is seen that special service calls are also handled by the terminating junctor via the regular switching network eliminating the need for a special switch train.

*Line group marker*

Two markers 200 are always provided and the 1000 line groups are divided between the two up to a maximum of five line groups per marker. Each marker serves its associated line group matrices on an allotted basis, but, is also capable of assuming the load of its companion marker.

In its idle state, a marker continuously scans for requests for service from the line groups with which it is associated. Upon recognizing a call, either originating or terminating, in a particular line group, it locks out all other groups via its allotter and allows the connect circuitry of the selected group to switch in the matrix leads into the marker for processing. Approximately 400 leads are so controlled. All calls in the allotted line group are processed before the marker returns to its idle state to serve other groups.

When connected to a line group, the marker has two primary functions, connect a line originating a call through the matrices and originating junctor to a register and to connect a terminating junctor (representing an incoming call) through the matrices to the called line. Both reed relays and electronic circuitry are used to perform these jobs. The electronic circuitry provides all logic and scanning operations requiring high speed. Reed relays are used merely for connecting purposes, to switch in the necessary groups of leads into the electronic circuitry for analysis. With this combination of components, the processing of a request for service by the line group marker is accomplished in approximately 100 milliseconds.

For each function, the marker performs several tasks. In general, for originating traffic, it must provide line number identification, pathfinding and route selection, sending of line number identification, class of service, and line group identity, For terminating traffic, it must provide terminating junctor identification, transceiver for communicating with the sender circuit, access to called line for busy test, PBX selection, and pathfinding and route selection.

The tasks performed by the marker in processing a call are controlled by a sequence and supervisory circuit 290. This control may be compared to a programmed computer in that the marker follows a fixed plan of operation. All marker operations are governed by this control.

Included in unit 290 is the clock circuit which provides pulses to synchronize operations within the marker and the timing circuitry which is used to generate various timeout periods such as that provided between a reed relay operation and a succeeding electronic scanning operation. Once the supervisory control recognizes a request for service, either terminating or originating, it will process this call from beginning to end, locking out all other calls.

A two-way communication path exists between the marker processing a terminating call and the sender circuit. In addition to receiving the called line number and any special instructions regarding the line, the marker may signal back to the sender any conditions peculiar to the line such as line busy, line idle, link congestion, recycle and send again, and be referred back to the sender for appropriate action.

If on a terminating call, the marker transceiver received a PBX call indication, a PBX selector circuit marks all lines in the PBX group and enables the line identifier to make a sequential test to select the first idle line. A maximum of 200 lines may be allocated within a 1000 line group for PBX service. Assignment of lines to a PBX group does not require consecutive numbering allocation.

THE GROUP SELECTOR

*Group selector matrix*

Figure 7:
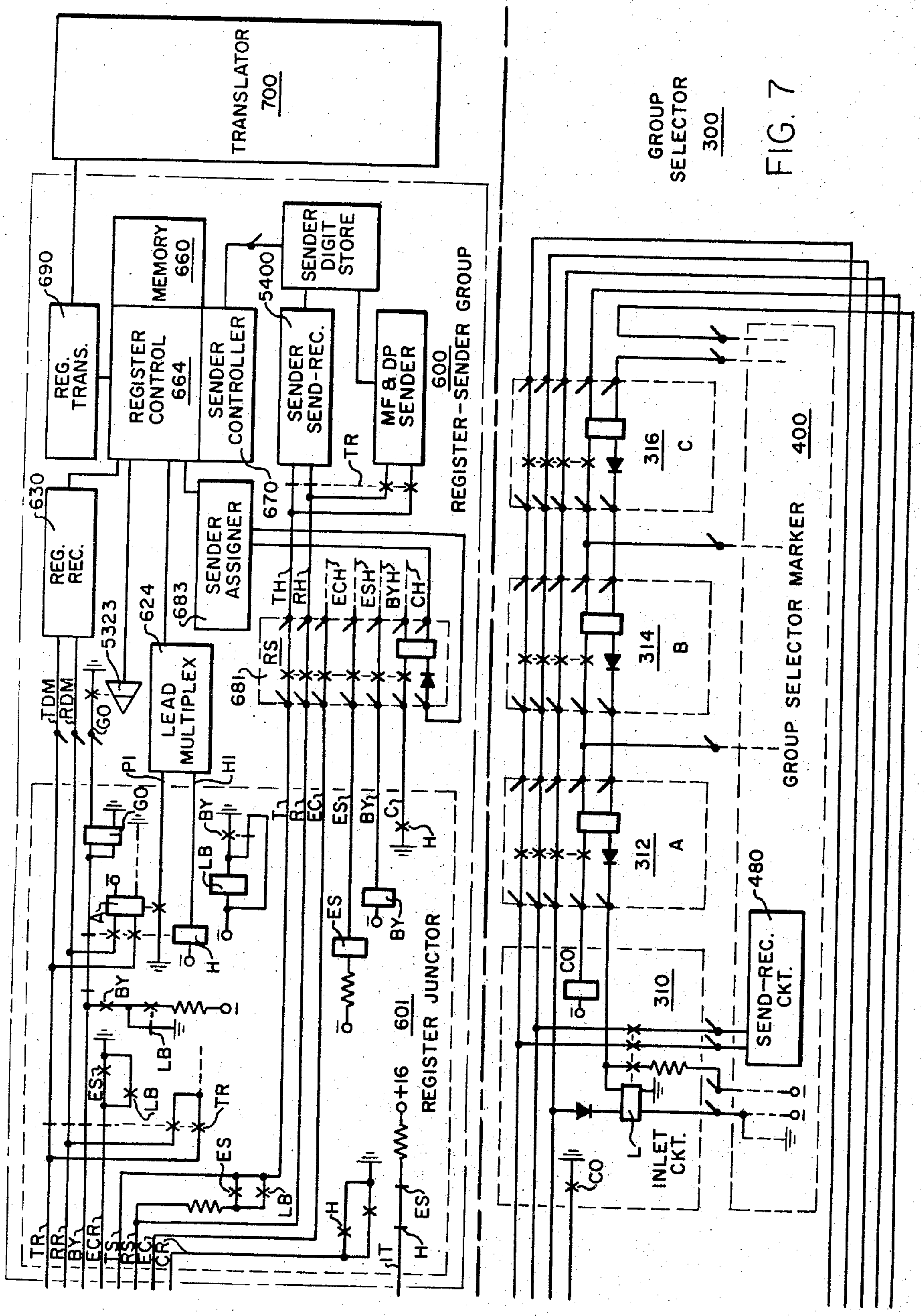

The intermediate switching functions of the system are performed by a group selector 300, FIGS. 2 and 7. Three stages of crosspoint switches are provided. The first switching stage 312, the A stage, contains 60 cards of 50 crosspoints, each arranged in a 5 x 10 matrix. This switching matrix is associated with the inlet circuit 310 line and cut-off reed relays to the group selector. The second switching stage 314, the B stage, contains 60 cards of 60 crosspoints each in a 10 x 6 matrix. The third stage 316, the C stage, uses a basic arrangement of 60 crosspoints in a 6 x 10 matrix to provide 600 outlets. The group selector has 300 inlets 310 serving the originating junctors in the line groups and incoming trunks.

The outlets of the group selector are arranged as 120 levels of 10 trunks each. These levels may be combined to accommodate trunk groups of any size.

*Group selector marker*

The operation of the group selector is controlled by an electronic marker 400. The marker has control of all crosspoints in the group selector and sets up calls on a one-at-a-time basis. The marker operates in response to selection digits received electronically in its transceiver 480 from the register-sender group. The holding time of the marker is approximately 100 milliseconds.

*Operational description*

In its idle state, the group selector marker is continuously scanning the group selector matrices for new calls. The register-sender group, via an originating junctor or incoming trunk, initiates a demand on a group selector by pulling the inlet line reed relay. When associated with a matrix, the marker finding the inlet demanding service stops its scanning at that point and connects a transceiver to the demanding inlet. The routing digits are sent in high speed code from the sender into the marker transceiver. During this same time, the marker operates connect reed relays to determine the link availability from the demanding inlet in the A stage toward the outlets through the B and C stages. Two routing digits are received by the transceiver in the marker and extended to the trunk selection portion of the marker where connect reed relays gate idle test leads of the selected trunk group into the trunk scanning portion. Within this scanner the link availability is combined with the trunk idle leads such that an idle trunk can appear idle to the scanner only if an appropriate idle link to the inlet exists.

If the trunk scanner finds an idle trunk, it pulls the proper group selector crosspoints, checks to make sure that the selected trunk becomes busy indicating seizure through the group selector crosspoints, and clears its circuits.

THE TRUNK GROUP

*Trunk group matrix*

The trunk group 500 (FIG. 2) provides access for incoming trunks from outside of the office or for special intra-office trunks such as operator or wire chief. A trunk group matrix is capable of connecting any one of 75 incoming trunks to any one of sixteen registers on a single output level basis.

*Trunk group marker*

The operation of the trunk group matrix is controlled by an electronic marker 550 which has control of all reed relays and sets up connections on a one-at-a-time basis. The marker operates in response to a call for service from a trunk group and sets up a path based on information concerning the condition of a register junctor (busy or idle) and the condition of any link (busy or idle). The holding time of the marker is approximately 50 milliseconds which is well within the interdigital switching time of any direct controlled system.

THE REGISTER-SENDER

The register-sender group 600 (FIGS. 2 and 7) is a time shared, common control unit with the ability to register and process twenty-four simultaneous calls. The fully equipped unit consists of twenty-four registers and ten senders.

The registers operate in a time division mode. There is one register junctor for every register in the group. Real time to time division entry is provided by this circuit. A common control unit 664 comprises time divided circuits which are shared by all twenty-four registers. These circuits are used by each register in turn and are organized to provide the need registration and process control for the registers. A temporary storage facility 660 is provided for the register group. Each register has an assigned storage area wherein all register information is placed to allow time division operation by the common control. A folded word oriented ferrite core memory is used for this purpose.

The extension of the proper switching digits, to the line or trunk selection stages of the system and to other connecting exchanges, is accomplished with a group of ten senders 671–680. These senders operate under the control of the registers and are used to transmit information in a dial pulse, multi-frequency, or code pulse manner.

Communication with the system translators, line group markers, trunk markers, and group selector markers is accomplished by high speed serial transfer of digital information using di-phase.

*Circuit description*

In order to facilitate understanding the following brief description of each of the circuits within the register-sender group is given.

The primary function of the register junctors 601–624 is to provide a buffer between the electronic equipment and the outside plant facilities. As such, the circuit employs reed relays for all switching functions, performing all those functions that require direct connection to the calling line or trunk. These include dial pulse repeating, dial tone control, battery feed for the calling line or trunk, calling station identification on party lines, test for coin deposit, coin refund, and test for coin refund. The circuit also controls the switch train and provides for peg count and traffic metering. Both multi-frequency and dial pulse junctors are used.

The sender circuits 671–680 provide means for transferring information (dialed digits or switching instruction) over the voice transmission path from the register-sender to the office markers or to distant offices. The sender is a universal sender inasmuch as it provides all modes of sending required by the system. Di-phase sending is employed for transmission of switching instructions to the office markers. The di-phase part of the circuit is actually a transceiver 5400 since it provides a means of receiving instructions from the markers as well as sending to the markers.

For outgoing calls, the sender provides for both dial pulse and multi-frequency signaling. The circuit operates in conjunction with the sender controller 670 which is common to all senders in the register-sender group. The sender controller supplies the sender with the digits to be sent out and indicates the mode of sending to be employed.

The sender circuit is mainly an electronic circuit except for outgoing loop supervisory equipment where reed relays are used.

The register receiver 630 is seized by the register controller 664 and assigned to serve the register junctor on a hold-til-finished basis. The circuit receives either the line number identification generated by the line markers or the trunk number identification generated by the trunk markers. On seizure of the circuit, a di-phase link is established to the marker being served. When all the digits have arrived in the register receiver, the information is presented to the register controller for storage in the area of the ferrite core array 660 associated with the register being served. Upon completion of this storage process, the register receiver 630 is released for use by the next register requiring service.

The register controller 664, operating on a time division multiplex basis, controls the progress of each call being processed. Within a particular time slot, this circuit up-dates the information in storage in the section of the core array associated with the time slot register.

The register transceiver 690 operates as the communication device for information transfer between the register-sender group and the system translators. It, like the register receiver, operates on a hold-until-finished basis. This circuit provides two-way di-phase serial communication between the translators and the register-sender group. The organization of this circuit is such that the transfer of information from the read-shift buffer to the register controller is in a parallel manner. Seizure is dependent on the condition of the control information available in the carry buffer.

The sender controller 670 utilizing information available to it in the read-shift buffer, controls the flow of information to be sent by the sender in use. It forwards control signals to the proper senders such as mode of send signals, end of send signals, and release signals. It presents to the senders the appropriate switching, and if necessary, dialed digits for proper routing of the subscriber's call.

The sender assigner 683, on request of the register controller, will connect an idle sender to the register junctor requiring service. The connection established by the assigner in the beginning of the terminating switch train, which will be extended by the system switching stages on information received from the sender. The sender assigner operates on a hold-til-finished basis.

THE TRANSLATOR

The translators 700 of the system provide semipermanent storage used by the system to direct the extension of telephone calls in accordance with the subscriber dialed digits.

Information storage is provided by magnetic drums 730 on the basis of one drum per translator. Memory words are recorded on the drum surface for a supervisory console 790, by simply typing the memory word and appropriate memory address at the console typewriter. This directory number and/or code translation can be added or existing translations altered with a minimum of maintenance effort.

LINE GROUP AND MARKER-DETAILED DESCRIPTION

Figure 5:
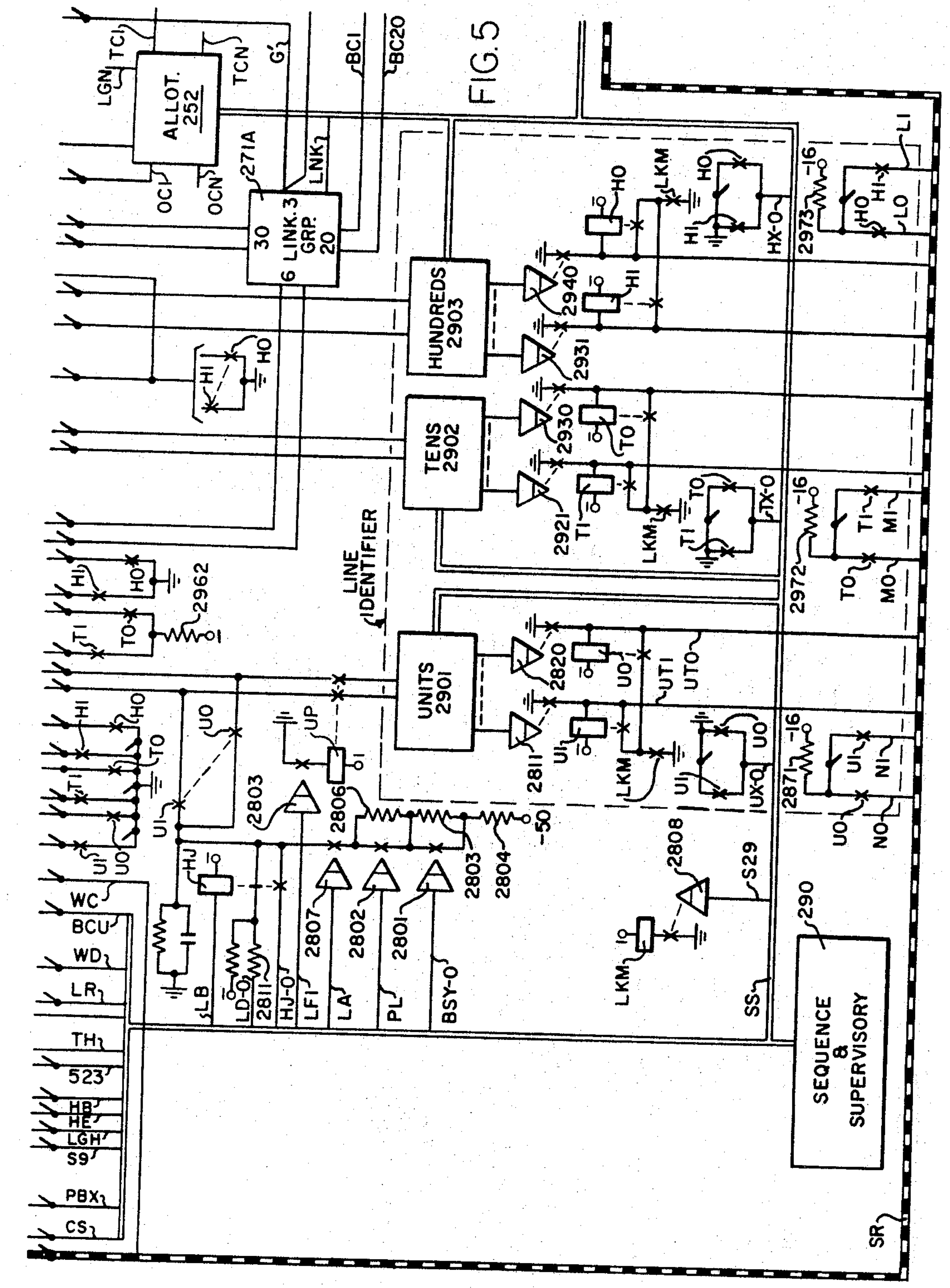
Figure 6:
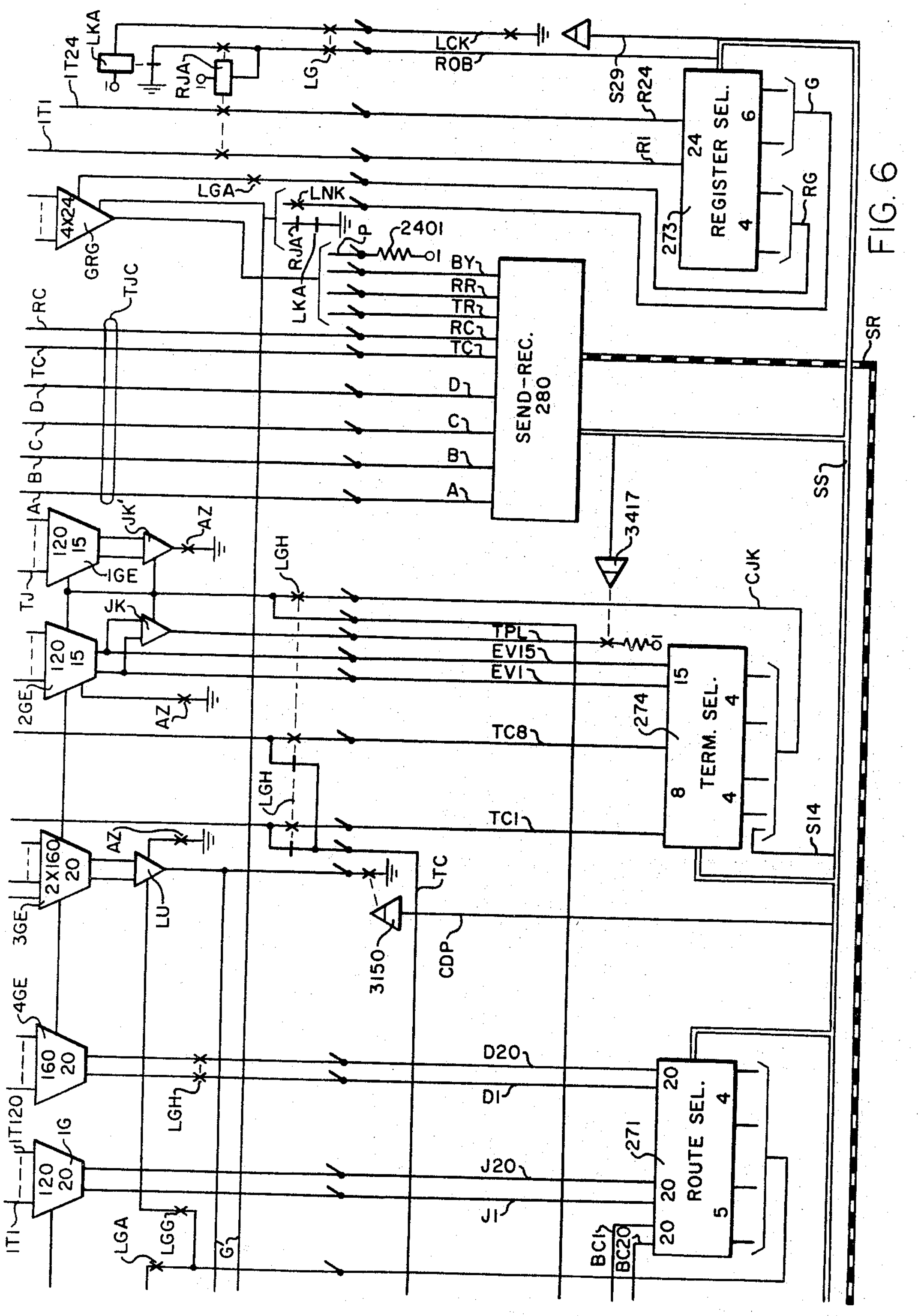
Figures 10, 13, 14:
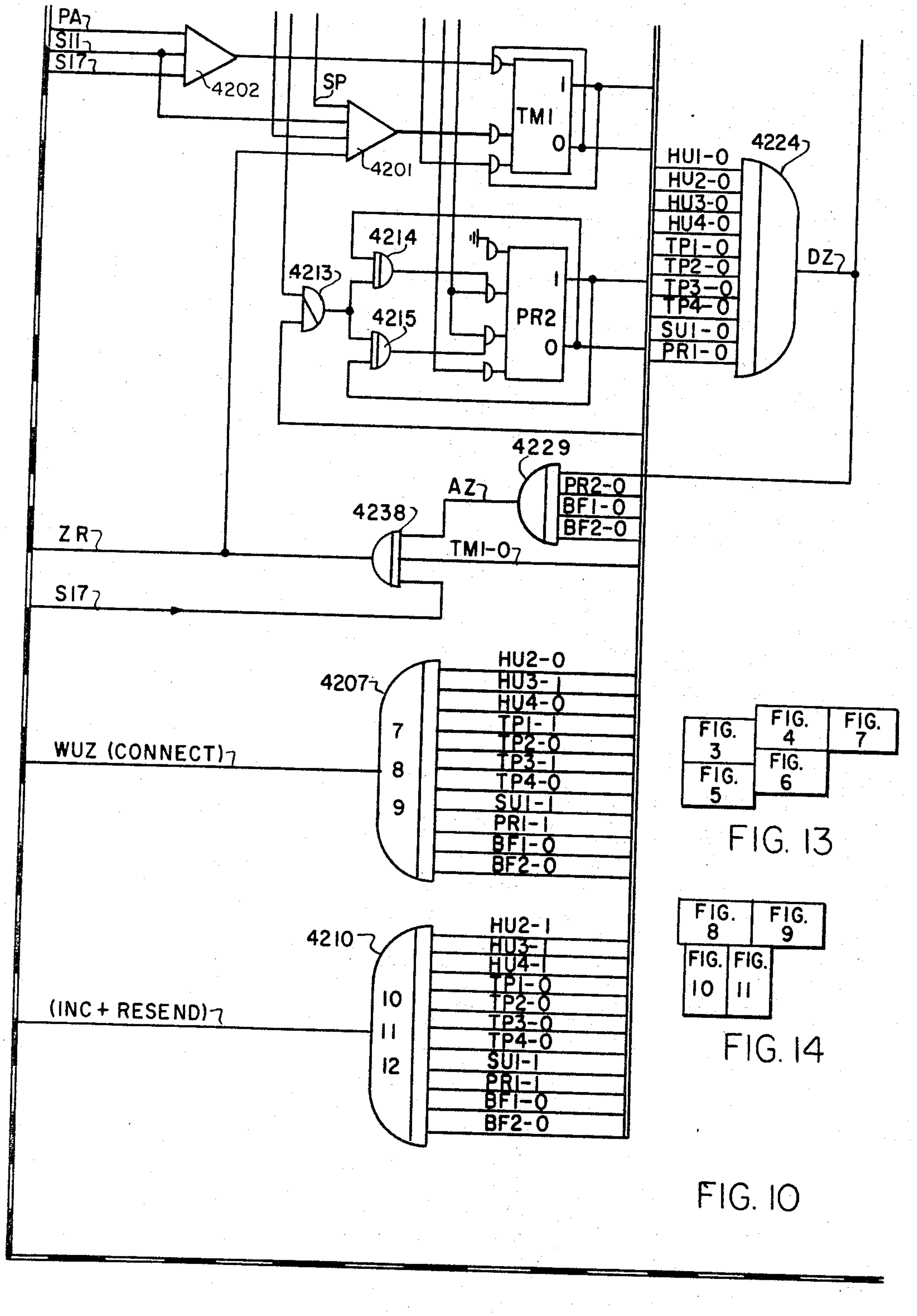
FIG. 13 shows how
FIG. 14 shows how

FIGS. 3–6 when arranged as shown in FIG. 13 comprise a schematic and block diagram of a line group and line group marker. The line group and marker are also shown in FIG. 1. The line circuits, switching matrices, and junctors are shown in FIGS. 3 and 4. The line group connect circuit 148 and the marker 200 are shown in FIGS. 5 and 6. The send receive circuit 280 is shown in more detail in FIGS. 8–11, arranged as shown in FIG. 14.

FIG. 1 shows the arrangement and interconnection of the switching matrices and junctors in a line group.

The subscriber lines are connected on the horizontal inputs of the A matrices, such that ten lines are connected at each A matrix. Therefore ten A matrices are provided for a group of 100 lines. Also for each hundreds group, six B matrices are provided, each B matrix having one input connected to each A matrix. Common to the ten hundreds groups or one thousand lines of a line group, there are thirty C matrices, and thirty corresponding D matrices. The connections are such that each C matrix and its corresponding D matrix has its ten inputs connected to the ten different hundreds groups. The verticals of the C matrices are connected to respective originating junctors, with originating junctors OJ1–OJ30 connected to the respective first verticals of the C matrices, originating junctors OJ31–OJ60 connected to the second verticals of the respective C matrices, originating junctors OJ61–OJ90 connected to the third verticals of the respective C matrices, and originating junctors OJ91–OJ120 connected respectively to the fourth verticals of the C matrices.

The originating junctors each have one output connection to the IDF for connection to the inlets of the group selectors, and another connection to the R matrices. Originating junctors 1–20 are connected to the respective horizontals of matrix R1, originating junctors OJ21–OJ40 are connected to the horizontals of the matrix R2, continuing up to matrix R6 which has its horizontals connected to originating junctors OJ101–OJ120. There are four vertical links from each R matrix, or a total of twenty-four, which are connected to the IDF for connection to the register junctors in the register sender group 600. The register junctors in each register sender group are connected to the R matrix verticals of several different line groups.

The E matrices each have twenty horizontal links connected respectively to twenty different D matrices, with matrix E1 connected to first verticals of matrices D1–D20, matrix E3 having its first ten horizontals connected to first verticals of matrices D21–D30 and its second ten horizontals connected to second verticals of matrices D1–D10. Matrix E3 has its twenty horizontals connected to second verticals of matrices D11–D30. Matrices E4 to E8 are similarly connected to other links of the D matrices. The verticals of the E matrices, fifteen from each matrix, are connected to the terminating junctors.

All of the matrices are designated by reference characters in which an initial letter designates the switching stage. In the A and B stages the letter is followed by two numbers. The first number indicating the hundreds group and the second letter indicating the matrix within the hundreds group. Thus in hundreds group one there are ten A matrices A11–A10 and six B matrices B11–B16. These A and B stages are interconnected by links designated by the letters AB followed by three numbers, in which the first number indicates the hundreds group; the second number indicates the A matrix in the hundreds group and the third number indicates the B matrix in the hundreds group to which the link is connected. Thus link AB111 of the first hundreds group connects card A11 to card B11. The lines from the line circuits to the inputs of the A stage are designated by the letter L followed by three digits, with the first number indicating the hundreds group, the second number indicating the A matrix within the hundreds group and the third number indicating the input of the A matrix. Thus lines L111–L110 are connected to the ten inputs of matrix card A11. In the C stage the matrix cards are designated C1–C30, and in the D stage the corresponding D matrices are designated D1–D30. The links interconnecting the B stages to the C and D stages are designated by the letters BC followed by three numbers. The first number indicates the hundreds group of the B matrix and the last two numbers indicate the C and D matrix, with a zero inserted as the center number for connections to cards C1–C9 and D1–D9.

The links interconnecting the D and E stages are designated by the letters DE followed by three numbers. The first number indicating the D matrix with a zero preceding the matrix number for the matrices D1–D9, and the last number indicating the D matrix.

The schematic diagrams of FIGS. 3 and 4 show one or two crosspoint reed relays of matrix cards of these stages; and also a line circuit, an originating junctor and a terminating junctor. Each link comprises four conductors, tip T, ring R, control C, and pull P. The tip and ring conductors provide an extension of the subscriber's loop for a talking path, the pull conductor is used to operate the crosspoints, and the control conductor is used to hold the crosspoints in a selected path. Between each horizontal link and each vertical link of a matrix card there is a crosspoint switch comprising three make contacts in three capsules, two windings, and a diode. To establish an originating path after the marker has selected the route, an operate circuit is established on the pull conductor through the three stages in series, through one crosspoint switch in each stage, to operate the crosspoints, then a hold path is established on the C conductor through the three crosspoints to hold the connections.

The line circuit LC111 comprises a line relay 12L having two windings and a single make contact, and a cutoff relay 12CO having a winding, two break contacts and a make contact. The tip and ring conductors of line L111, which are connected to the subscriber's loop, are also connected via the break contacts of the cutoff relay 12CO through the windings of the line relay 12L to ground and negative battery respectively. The conductor L111C is connected through the winding of the cutoff relay 12CO to negative battery. The conductor L111P is connected through the make contact of relay 12L and a resistor 1211 to conductor LR1 to the marker; and also through the make contacts of the cutoff relay 12CO and a diode 1212 to conductor BCO to the marker. The conductors LR1 and BCO are multipled to all of the one thousand line circuits of the group. There is also a connection from the cutoff relay by an individual conductor WC111 to the marker, for wire chief use.

The originating junctor (FIG. 4) provides connections from the originating path from the C matrices by a line OJ1A through the junctor and line OJ1B and the R matrix to a register junctor, and line OJ1C to the IDF for access to an inlet circuit of the group selector. The transmission path (conductors T and R) from the C matrix to the group selector is split in the originating junctor. The incoming path is connected to the register by leads TR and RR; and the outgoing path by conductors TS and RS to the sender. The contacts of relay 15JB provide the split. Switching through of the connection from line OJ1A to line OJ1C is accomplished by operating relay 15JB under control of the register via lead ECR, which in turn causes the operation of relay 15JA.

Holding of the preceding switch train by ground on the lead C of line OJ1A is under control of the register junctor via lead CR to relay 15JA before cut through; and under control of the group selector via lead C in line OJ1C to relay 15JA after cut through. The R matrix is released after cut through.

If a link busy condition is encountered, relay 15BT is operated by the register junctor via lead BY to return link busy tone (120 i.p.m.). Relay 15BT remains operated under control of the calling group. No cut through occurs under this condition.

The terminating junctor (FIG. 4) provides access from a group selector outlet, via the IDF and line TJ1A through the junctor to line TJ1B and thence through matrices E, D, B and A to a called line.

Battery feed is provided to the calling line by relay 18BF, and to the called line by relay 17BF.

Busy-idle indication is provided on lead IT of line TJ1A for use by a parallel test circuit in the group selector marker.

Relay 17TJS when operated provides a path from the TO and RO conductors of line TJ1A to conductors TC and RC of line TJC, which completes a path from the sender over the transmission path to the send receive circuit in the marker. This relay is operated under the control of the marker by a signal on lead TJ. Relay 17TJS also completes a path for the ringing code signals from the send receive circuit on conductors A, B, C and D of line TJC to the ringing control relays (not shown).

The junctor is seized by ground forwarded via lead ECO of line TJ1A to operate relay 17S. This relay completes a path to ground to hold the preceding switch train, and another path to ground to hold the succeeding switch train.

Operation of one or more of the ringing relays (not shown) applies one of five different ringing frequencies to either lead T or lead R to provide fully selective five-party bridged or ten-party divided ringing, in accordance with the binary code received on leads A, B, C and D as shown in the following table.

| A | B | C | D | Gen. Connection | Ringing Frequency |
|---|---|---|---|---|---|
| 0 | 1 | 0 | 1 | T | F1 |
| 1 | 0 | 0 | 0 | R | F1 |
| 0 | 1 | 0 | 0 | T | F2 |
| 1 | 1 | 0 | 0 | R | F2 |
| 0 | 0 | 1 | 0 | T | F3 |
| 1 | 0 | 1 | 0 | R | F3 |
| 0 | 1 | 1 | 0 | T | F4 |
| 1 | 1 | 1 | 0 | R | F4 |
| 0 | 0 | 0 | 1 | T | F5 |
| 1 | 0 | 0 | 1 | R | F5 |
| 0 | X | 1 | 1 | T | F1 |
| SPECIAL FUNCTIONS | | | | | |
| 1 | 1 | 0 | 1 | Return line busy (60 i.p.m.) | |
| 0 | X | 1 | 1 | No ans. supy. (19OFC operates) | |
| 1 | X | 1 | 1 | No ans. supy. or ringing (19OFC and metallic cut-through (19SPC operates) | |

Ringback tone is supplied to the calling party during ringing. Busy tone from a 60 i.p.m. source is supplied to the calling party when the proper binary code as shown in the table is received from the marker to operate a busy relay (not shown).

In response to answer supervision a ring trip relay (not shown) operates and shorts the winding of a relay (contacts only shown) which connects the called party to the voice transmission path. Relay 17BF then operates, and applies ground which extends through break contacts of relay 19OFC (contacts only shown) to lead ECO of line TJ1A to repeat answer supervision to the preceding switch train.

In response to one of the codes as shown in the table, relays 19SPC and 19OFC operate to provide a metallic path (T and R) free of attachments and inhibits ringing and answer supervision for verification, wire chief, and routiner calls. In response to another code, relay 19OFC operates to inhibit answer supervision on calls to official numbers, such as the telephone company business office.

Release of the succeeding switch train may be controlled by a routiner. Opening lead EC relases the succeeding switch train but holds the terminating junctor seized. The terminating junctor is released when negative battery potential is applied to lead EC.

Release of the preceding switch train is delayed approximately 135 milliseconds after the calling party releases to protect against unintentional interruption of the calling loop.

Timed disconnect of the preceding switch train and the terminating junctor 30 seconds after the called party disconnects is provided.

An arrangement is provided to permit the called party to hold the succeeding switch train and the terminating junctor.

The line group connect circuit 148 is shown by triangles and trapezoids representing relay trees in FIGS. 3 and 4, and also in FIG. 1. The line group marker 200 is shown by a schematic and block diagram in FIGS. 5 and 6, and also by blocks at the bottom of FIG. 1. For convenience in the drawing, relays are shown having a large number of contacts although in the physical embodiment of this system the reed relay assemblies have been limited to ten contacts, and additional contacts are obtained by using parallel and slave connected reed relays. A relay driver device shown symbolically in the drawings by a triangle with a line across it and associated make contact, comprises a single transistor amplifier with a winding in its collector circuit and the single contact which is a reed capsule operated by the winding.

The principal units of the line identifier are a hundreds scanner 2903, a tens scanner 2902, and a units scanner 2901. These units may be scanners or parallel test and lockout circuits which perform the following functions: (1) a signal at any one of the inputs causes a device corresponding with this input to be set, (2) with one of these devices in set condition signals at other inputs are inhibited from setting their corresponding device, and (3) the device in said position operates a corresponding relay. Many circuits exist which meet these requirements. In one chosen embodiment scanners operated under the control of pulse sources and sequence state circuits in the sequence and supervisory unit 290 have been used. The output devices comprise relay drivers 2931–2940 from hundreds scanner 2903, relay drivers 2921–2930 from tens scanner 2902, and relay drivers 2811–2820 from units scanner 2901. The relays which are operated under the control of the relay drivers are relays H1–H0 associated with the hundreds scanner 2903, relays T1–T0 associated with the tens scanner 2902, and relays U1–U0 associated with the units scanner 2901.

Looking at the P leads of the horizontal inputs of a single one of the matrices such as matrix C1, a negative potential applied to the P lead in any one of the line circuits can be detected through the diodes and pull windings of the A and B matrix cards, since the diodes are forward biased. Thus a negative potential applied to the P lead at any line circuit of hundreds group 1 such as to conductor L111P, can be detected at the first horizontal input of matrix C1, on conductor BC101P. Likewise a call in any of the other hundreds group of the 1000-line group will appear at a corresponding one of the P leads of the horizontal inputs of matrix C1. These leads are taken through contacts of relay HE, to the ten inputs of hundreds scanner 2903. Likewise in each hundreds group the P leads of the horizontal inputs of any one of the matrices can detect a potential at any one of the ten lines of the A matrix card connected to that input. Thus in hundreds group 1 a call at any one of the lines L111 to L110 at the inputs of card A11 will appear at the conductor AB111P at the input of card B11. The ten leads AB111P to AB101P from card B11 of hundreds group AB1 (FIG. 1) and the corresponding ten leads from matrix card B11 of each of the other hundreds groups are taken through relay tree HEP which selects the ten leads of one hundreds group in accordance with the output of the hundreds scanner, and the ten leads are then taken through contacts of relay HE to the ten inputs of the tens scanner 2902. At the horizontal input terminals of the A cards, all of the 1000 P leads, ten from each card of the 100 A matrix cards, for example, leads L111P to L110P of card A11 of group AB1, pass through relay tree LS which selects the ten leads from one A matrix in accordance with the hundreds and tens selection, which are taken through contacts of relay LG and contacts of relay UP to the units scanner 2901. The inputs to each of the scanners are multipled to the other line groups as shown by the multiple symbols.

*Sequence and Supervisory Circuits 290*

The sequence and supervisory circuits 290 include a sequence state register, miscellaneous flip-flops, an operational timer, and a cycle counter, which supply signals used by the other units in the marker. These ciruits will be referred to in the section describing the operation of the marker.

Figure 12:
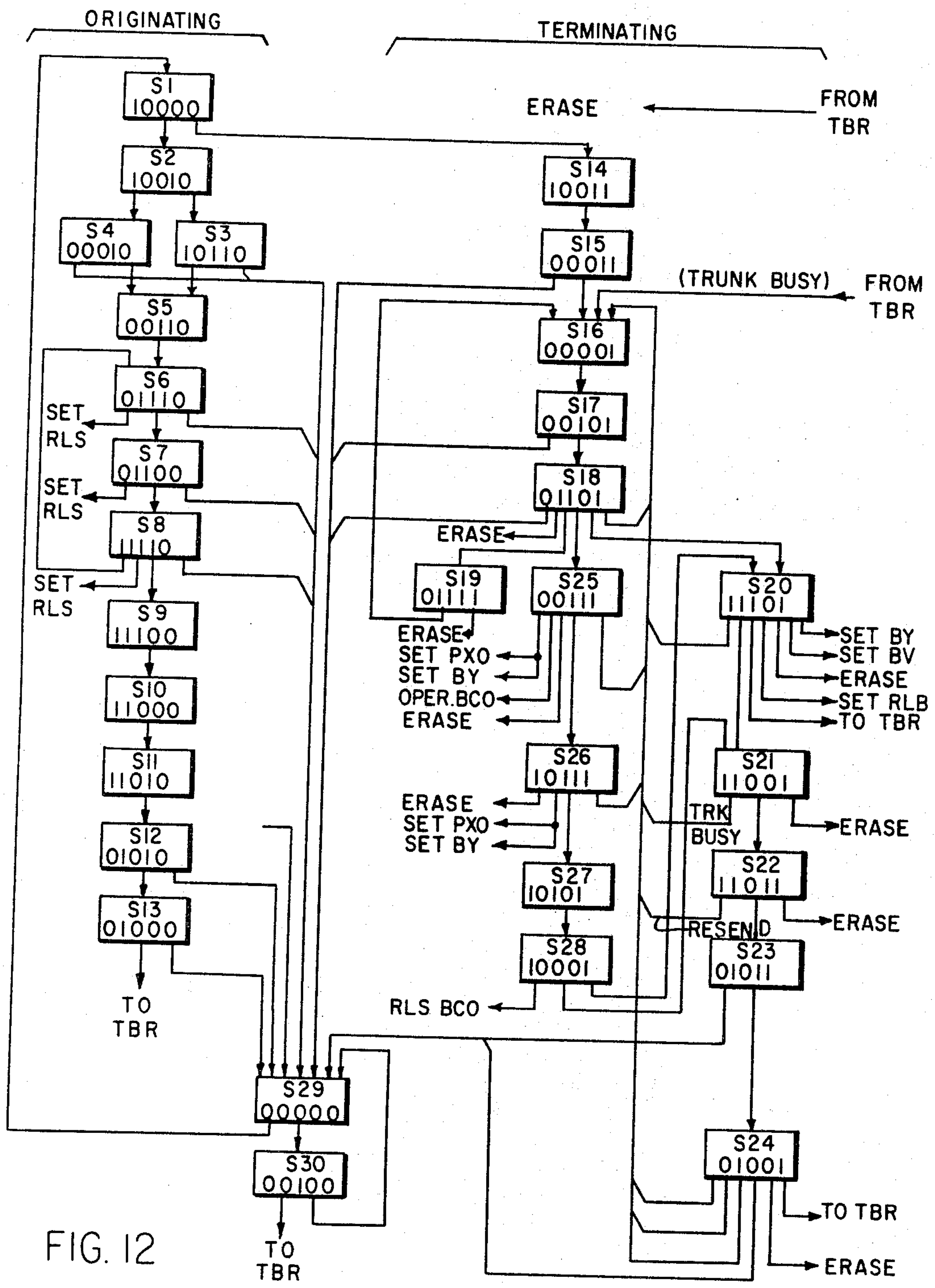
FIG. 12 is a sequence flow chart.

The sequence state flow chart is shown in FIG. 12. On the flow chart each of the boxes includes the decoded designation of the sequence state at the top and below it appears the binary code of five flip-flops representing that sequence state. The significance of each of the sequence states is explained in the section on operation of the line group marker. Briefly, states S2–S13 are for originating calls, states S14–S28 for terminating calls and states S29 and S30 are idle states. At the end of each call sequence state S29 is entered, and if there is another call in the same line group state S1 is entered. If there is no call in the same line group the sequence changes from S29 to S30, and if the allotter shows a call in another line group the sequence goes from S30 to S29 to S1. If there is a terminating call it is given preference and state S14 is entered. If there is an originating call and no terminating call state S2 is entered.

*Send-receive circuit 280*

Figure 8:
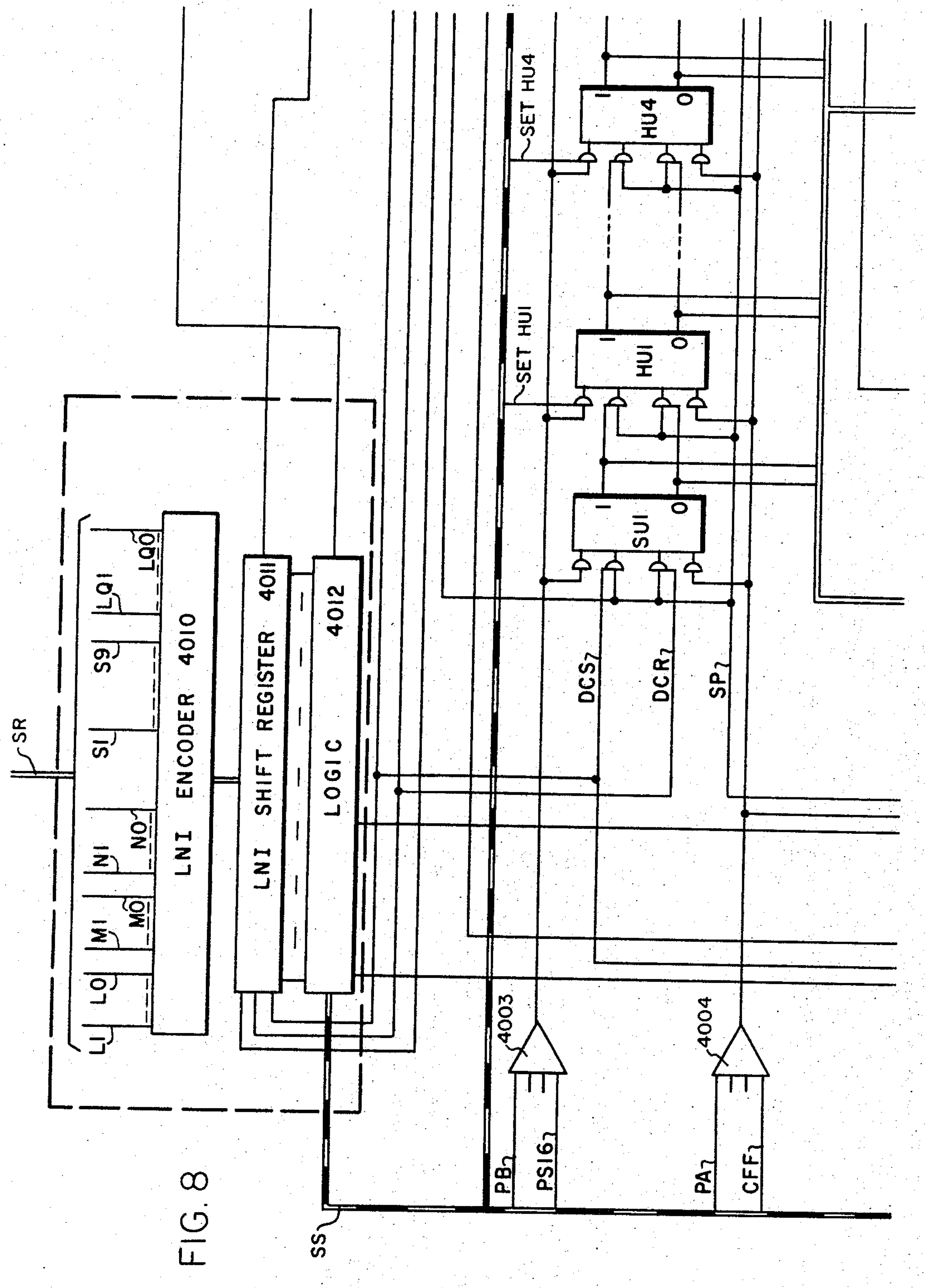
FIGS. 8–11 are to be arranged.
Figure 9:
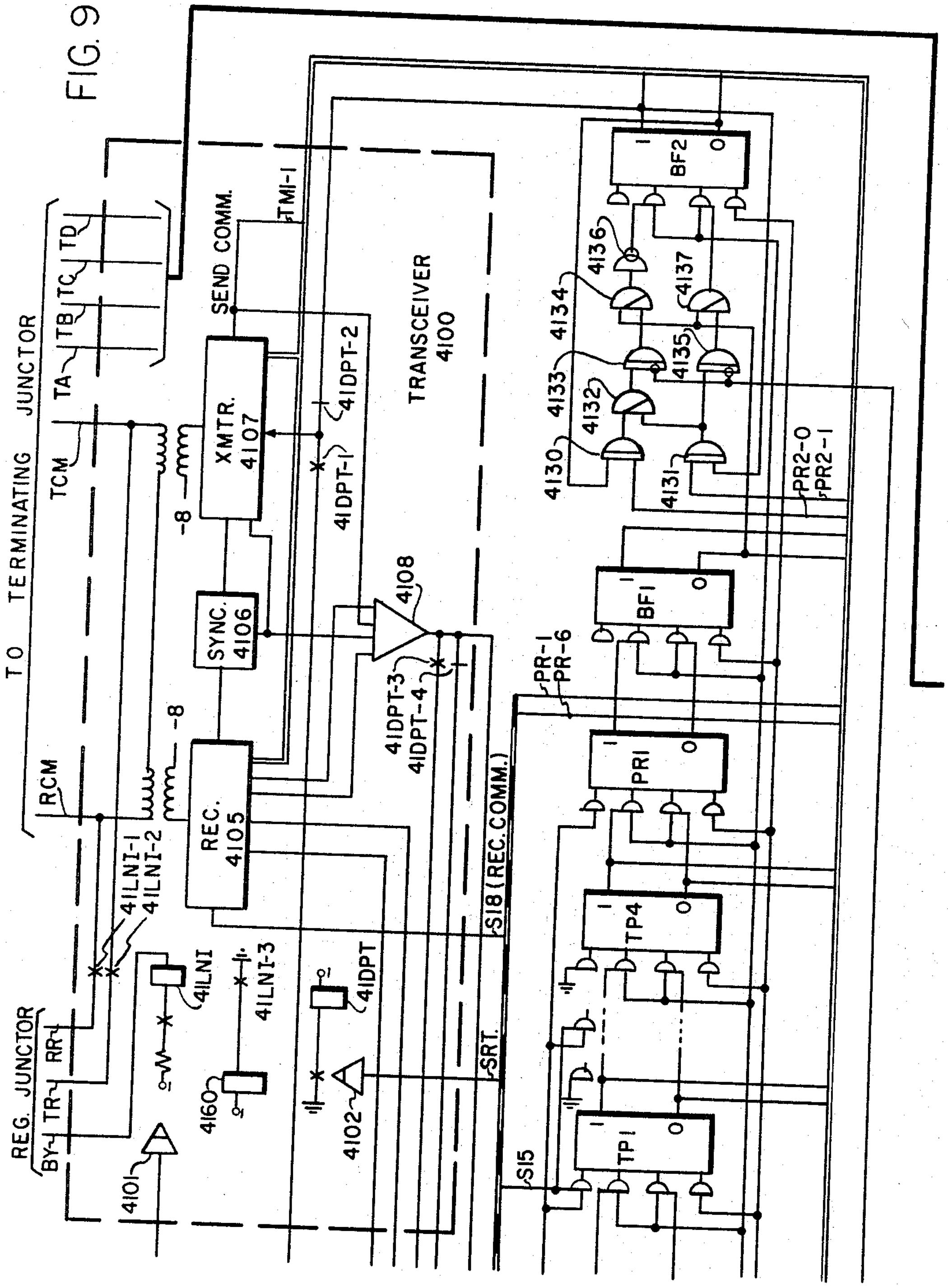

Referring now to FIGS. 8–11, the line group marker send-receive circuit 280 provides a means to communicate with other sections of the system via high speed serial transmission. The send-receive circuit comprises an LNI sender for originating calls, a terminating call portion, and a common transceiver. The LNI sender 4000 is shown in FIG. 8 as comprising an LNI shift register 4011, an LNI encoder 4010 for parallel loading of the shift register, and logic circuit 4012. The terminating call portion comprises a shift register shown by functional blocks extending across the bottom of FIGS. 8 and 9, along with logic circuits in FIGS. 10 and 11. The common transceiver 4100 is shown in FIG. 9, and comprises a receiver 4105, synchronizing circuits 4106, a transmitter 4107, and control circuits.

The LNI portion of the send-receive circuit is provided to transmit the hundreds, tens, units, class of service, and line group matrix identity of the originating line information to the register sender group. This information is parallel loaded via the LNI encoder 4010 into the LNI shift register 4011. The relay driver 4101 closes its contact between resistance battery and the winding of relay 41LNI to thereby transmit a signal over lead BY, and as shown in FIGS. 6, 4 and 7, through the relay tree RG to the register junctor 601. This signal is repeated via circuits in the register junctor 601 and lead multiplex 624 to the register, which provides an acknowledgment by operation of relay driver 5323 to put an additional ground via relay GO on lead BY, which causes relay 41LNI to operate. The information from the shift register 4011 is then transmitted serially using transmitter 4107, through contacts 41LNI–1 and 41LNI–2 to conductors TR and RR and transmitted through the register junctor 601 into register receiver 630.

Figure 11:
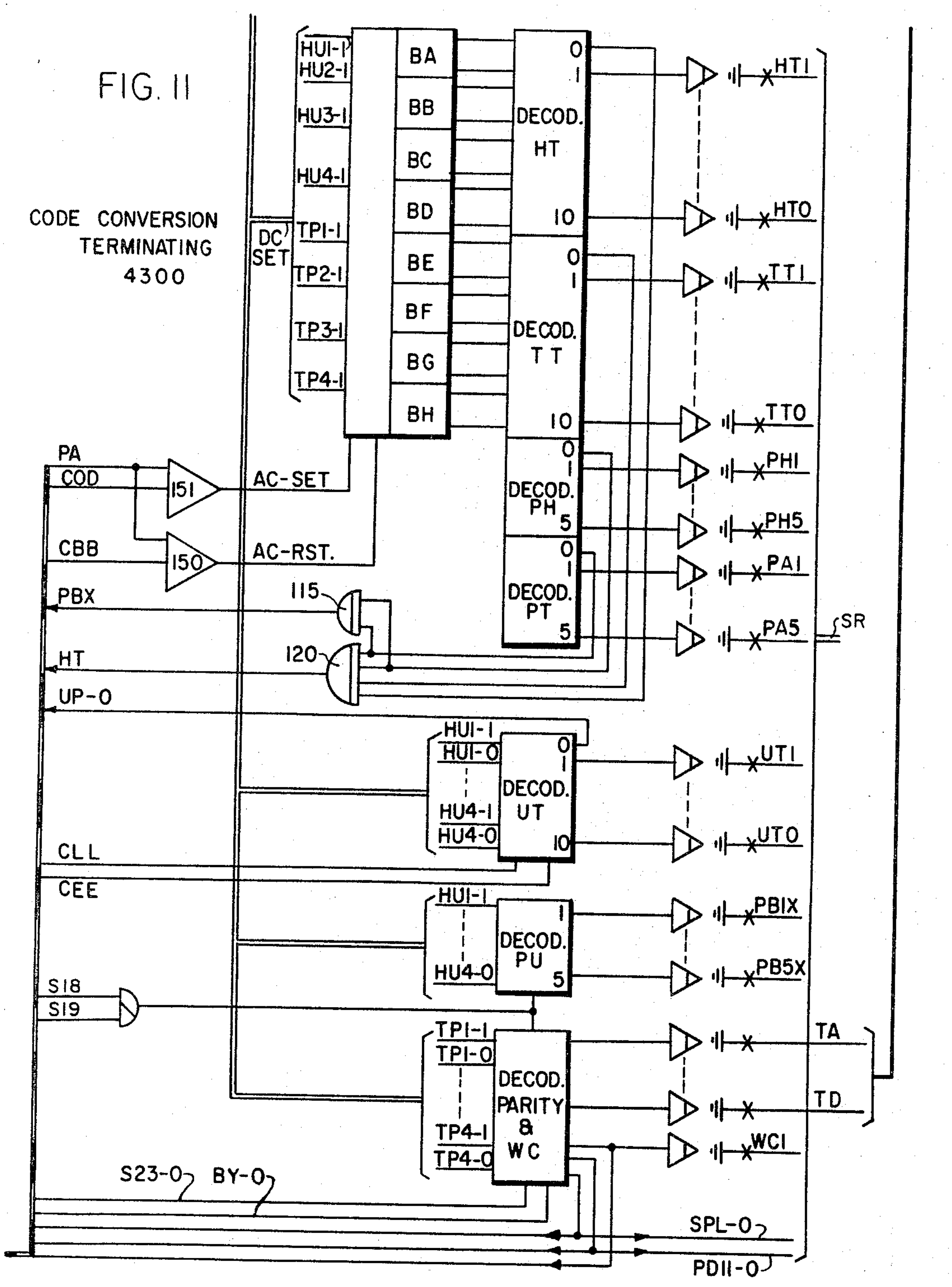

The terminating call shift register comprises flip-flop SU1, four flip-flops HU1–HU4 in FIG. 8, flip-flops TP1–TP4, flip-flop PR1, flip-flop BF1, and flip-flop BF2 in FIG. 9. Di-phase control circuits and various logic circuits for terminating calls are shown in FIG. 10, and decoder circuits associated with the terminating call shift register are shown in FIG. 11. Logic is provided for loading and sending instructions (i.e. trunk busy, resend, incomplete, etc.) to the register sender group. Logic is also provided for checking parity of the received data (even number of binary "ones" received), which is accomplished by flip-flops TM1 and PR2. These two flip-flops are used for both the originating shift register and the terminating shift register. Logic is also provided to clear and load data into the shift register.

The code conversion for the terminating portion of the send-receive circuit provides logic to store the information received in the terminating shift register and to change the stored binary information into decimal form for use by the other line group marker circuits. This data constitutes the equipment location identity of a line or PBX group to which the call will be terminated and comprises the hundreds decoder HT, tens decoder TT, units decoder UT, and the party digits and wire chief decoder. Special instructions such as verification and wire chief are processed as part of the party digit information. Decoders PH, PT, and PU generate the PBX information. Logic AND gate 4207 generates the connect signal which is sent to the sender when the transmission path is established thereto. Logic AND gate 4210 generates the incomplete or resend command which is decoded by the sender transmitter in the register sender group. Trunk busy, line busy, and line idle are generated by the sequence and supervisory circuit. Logic AND gate 4214 generates signal DZ which indicates all zeros in the shift register. Logic AND gates 4238 and 4229 generate command ZR which is used by the sequence and supervisory circuit.

OPERATION OF LINE GROUP MARKER—ORIGINATING CALL

The operational description may be followed on FIGS. 3–7, or FIG. 1 may be used in place of FIGS. 3–6 with FIG. 7, or FIG. 2 may be used.

Assume now that the subscriber at station S111 initiates a call. In response to the closing of the subscriber loop, the line relay 12L of line circuit LC111 operates and closes its contacts. Negative battery potential through the break contacts of relay LR is applied over conductor LR1 and resistor 1211 of line circuit LC111 and the contacts of relay 12L to the pull conductor L111P, thence through diodes and pull windings on card A11, and card B11, to conductor BC101P at the input of card C1. The potential is also applied through a diode and pull winding of card C1 to the lead OJ1AP of vertical V1, thence by way of conductor OC to an input of the allotter 252. The allotter operates relay LG, and other line groups are locked out.

The supervisory signal HF through contacts of relay LG operates relay HE. Relay HE prepares operate circuits for the relay tree, connects through the conductors BC101P to BC001P to the hundreds scanner 2903.

Referring now to the flow chart, FIG. 12, and assuming that the marker was in the idle state S30, in response to signals LG and OC from the allotter, the sequence operation is started, going from S30 to S29 to S1.

It is assumed that there is no terminating call, so the marker goes to the originating call sequence, entering S2.

The marker determines whether there is a call in the priority hundreds group "1." If the call is in other than hundreds group "1," a signal OCX is generated and steps the sequence to state S3, which causes a 10-step counter in the hundreds scanner 2903 to start and step until it finds coincidence of its output with a signal at one of the inputs to the scanner. The scanner then operates the corresponding one of the relay drivers 2931 to 2940, which places ground on lead HX–0.

However in our case the call is in hundreds "1," which is given priority, so a signal OC1 is generated, and the sequence goes to state S4.

The signal S4 causes hundreds scanner 2903 to directly operate the relay driver 2931 which supplies ground potential to operate the relay H1. Relay H1 locks to ground potential at break contacts of relay LKM. Ground potential through contacts of relay H1 completes the operating path for relay tree HEP, connecting conductors AB111P to AB101P from card B11 via contacts of relay HE to the inputs of the tens scanner 2902. A ground signal at contacts of relay H1 is transmitted by way of conductor HX–0 and cable SS to the sequence and supervisory circuits 290.

This causes the tens scanner to start counting. Since the call is in tens group 1 the tens scanner finds coincidence at step 1 and operates the relay driver 2921, which in turn supplies ground potential to operate the relay T1. Relay T1 through its contacts locks to ground potential at break contacts of relay LKM.

Negative battery potential is supplied through resistor 2962 and contacts of relay T1, while ground potential is supplied through contacts of relay H1 through contacts of relay tree LS.

The ten leads L111P to L110P from the horizontal inputs of card A11 are connected through relay tree LC, contact of relay LG, and contacts of relay UP to the inputs of units scanner 2901. At contacts of relay T1 a ground signal is sent by conductor TX–0 and cable SS to the sequence and supervisory circuits 290.

The marker now is ready to pre-select a register.

The register selector 273 includes a scanner which includes a four stage counter and a six stage counter. Relay RJA has operated via lead ROB during (S3+S4+S5) and locked through contacts of relay LKA. The idle test leads from the twenty-four register junctors are connected from the IDF through break contacts of relay RJA to the respective conductors R1–R24 to a parallel test circuit in register selector 273. The scanner is driven during state S6. Upon coincidence of the scanner position and an idle indicating potential on one of the leads R1–R24 it places busy indicating potential on the idle test lead to prevent selection of the register junctor by another marker; and generates a signal PS to stop the scan. Relay LNK is operated during states S6, S7 and S8 via supervisory lead HB. The register selector output, via one of the six conductors G through contacts of relay LNK operates the relay trees 1G, 2G and part of GRG. The signal PS advances the sequence to state S7.

The signal S7 causes the units scanner 2901 to start stepping. The counter finds coincidence at step 1 and operates the relay driver 2811 which in turn operates the relay U1. Relay U1 at its contacts and break contacts of relay LKM locks to ground.

With the relays H1, T1, and U1 operated the line L111 is identified.

The marker is now ready to select a route. First a check is made in link grouping unit 271A whether AB links are available to the A matrix. If all six of the AB links are busy, ground is applied to lead LNK to mark it false. Otherwise signal LNK is true, and along with the units scanner signal UX, advances the sequence to state S8.

The route selector 271 includes a scanner which includes a five stage counter and a four stage counter.

Preselection of an idle register defines a group of twenty originating junctors connected to the same R matrix. The twenty idle test leads from the corresponding originating junctors are connected through relay tree 1G to the twenty inputs J1–J20 of route selector 271.

To test the interstage links for available paths, advantage is taken of the fact that the holding current in a busy path provides a negative potential on the C conductors of the links. To test the BC links, the vertical C terminals of the B matrices are connected via relay tree BC, which is operated from ground at contacts of relay H1. The thirty BC links from the first hundreds group are connected through tree BC and contacts of relay LNK via leads BC1A–BC30A to unit 271A. The links are grouped in accordance with marked one of leads G1 to select twenty of these leads corresponding to the twenty selected originating junctors. There are six AB links to the A matrix which extends to the calling line. In this case the calling line is on matrix A11, and relay tree LS' has been operated by the line identifier to connect the C leads from these links which via contacts of relay LNK are connected to grouping unit 271A. Each busy link blocks paths via five BC links, which are made to appear busy in the unit 271A.

The route selector scanner steps to test coincidence of an idle BC link and a corresponding originating junctor idle test lead.

It is possible that an idle route does not exist between the idle preselected register, an originating junctor, and an idle path from there to the calling line. Therefore, if an originating route is not found, up to six attempts are made by cooperation between the register selector and the route selector scanners to find a route by preselecting idle registers which may define other originating junctor groups.

Upon finding a route a signal OTR is sent to the sequence circuits 290 to stop the scanner and advance the sequence to state S8.

Relay LGA operates in response to signal S9. Relay LNK releases. Relay LNK at a set of break contacts completes a locking path through break contacts of relay LKA for the operated relay trees 1G, 2G and partly operated GRG, before the operate path is opened at make contacts of relay LNK. The register selector 273 output via one of conductors RG through contacts of relay LGA completes the operation of relay tree GRG, which locks at contacts of relay LKA.

Operation of one of the relay tree GRG connects the leads RR, TR, and BY from the LNI sender portion of the send receive circuit 280 to one of the twenty-four vertical links from the R matrices such as that to register junctor 601, and negative potential through resistor 2401 to the P conductor of the corresponding vertical link.

From the output of route selector 271 through contacts of relay LGA relay tree PU operates and locks to ground through break contacts of relay LKA.

For the duration of states S9, S10 and S11 ground on lead LR operates relay LR. This removes negative potential and places ground potential via lead LR1 and resistor 1211 to the P leads of all line circuits having their line relays operated. After eight milliseconds a signal on lead LA operates relay driver 2807 to complete a path from negative 50 volts and resistor 2804 to the pull lead L111P of the line circuit being serviced by the marker. Therefore only this one line has the class-of-service diodes in 261 marked with negative potential.

The signal on lead LFI is false, so that relay driver 2803, and thereby relay UP, is released during states S9 to S13 inclusive to disconnect the inputs of the units scanner 2901.

The LNI shift register 4011 is cleared, producing a signal ZS. Logic 4012 supplies a signal to advance the sequence to state S10.

The shift register 4011 is now loaded via encoder 4010. The identity of the calling line is supplied through cable SR to the send receive circuit 280, from a negative 16 volt source through resistor 2973 and contacts of relay H1, through resistor 2972 and contacts of relay T1, and through resistor 2871 and contacts of relay U1.

To provide a class of service indication, the P conductors of the line circuits connected from the horizontal P terminals of the A matrices to a diode field in 261 as required provides a signal on the conductors CS1–CS9 for the line circuit selected by the line identifier. Negative potential through a resistor in 261 via lead LQ1 identifies the line group. Operation of relay LGH at its contacts extends a signal CS to the class unit 261, to thereby extend the signals on the leads CS1–CS9 and lead LQ1 to the send receive circuit.

A signal condition PARC from logic 4011 indicates correct fixed logic in the shift register. Relay driver 4101 is operated by signal condition (PARC+S11), closing a path from resistance battery through relay 41LNI to lead BY, which operates a relay in the register junctor, but not relay 41LNI. When ready, the register junctor responds by reducing the resistance to ground on lead BY, operating relay 41LNI. Relay 41GO operates, making signal GO true. The logic 4012 produces a signal to advance the sequence to state S11.

The information is now transmitted from the shift register 4011 via leads TR and RR, by the path through relay tree GRG to the vertical link one of matrix R1, and thence via the IDF and through the register junctor 601 (FIG. 7) to the register receiver 630. A signal condition PARD indicates that the information in the LNI shift register 4011 has been shifted to the last position. The logic 4012 generates a signal to advance the sequence to state S12.

After eight milliseconds a signal on lead CDP operates relay driver 3150.

Assume now that a route has been selected from line circuit LC111 by way of originating junctor OJ1 to the register junctor connected through the first vertical of matrix R1, and assume that the sequence circuit has activated the signals for pulling the connection. Then starting in FIG. 5, negative battery potential extends through resistor 2804 and contacts of relay drivers 2801, 2802 and 2807, through contacts of relay U1 and thence through contacts of relay LG and relay tree LS to conductor L111P, thence through diodes and pull windings in matrix A11, in matrix B11, in matrix C1, to the P conductor OJ1AP, thence through relay trees 2G and PU to ground at contacts of relay driver 3150. Also negative battery potential is extended through resistor 2401, relay tree GRG, to the P conductor of the vertical V1 of matrix R1, a pull winding and diode in matrix R1 to the P conductor OJ1AP to the same ground. Therefore the crosspoints in the matrices A11, B11, and C1 operate in series, and the crosspoint in matrix R1 also operates. The register junctor applies the holding ground on lead CR which extends through the hold winding in the matrix R1 to operate relay 15JA in the originating junctor. This supplies a ground on the C lead which operates in series through the hold relays in the matrices C1, B11, and A11 to the cutoff relay 12CO in the line circuit to thereby hold the connection.

Operation of cutoff relay 12CO releases the line relay 12L, and also connects ground on lead BCO to the pull conductor L111P, which extends via tree LS and contacts of relays U1 and HJ to resistor 2811, making signal LD true. This causes signal BSY to be true and advances the sequence to state S13.

The relay drivers 2807 and 3150 now release, which disconnects the pull potentials from the switching network. The sequence advances to state S29.

Relay drivers 2808 and 3022 operate to cause the locking relays LKM, LKA and LCM to operate, thereby releasing all previously locked relays in the marker and connect circuits, but not those in the allotter. The marker is now ready to serve another call. Assume no call is waiting in the same line group. The sequence advances to state S30. The allotter releases. The marker is now idle.

OPERATION OF LINE GROUP MARKER—TERMINATING CALL

The terminating selector 274 includes a scanner which comprises two four stage counters. The same scanners and logic are used for two distinct scanning operations. In the first operation the one of the eight E matrices and corresponding terminating junctor group in which the call appears is selected. In this operation the second counter is used as a two stage counter. In the second scanning operation the particular terminating junctor in the group is selected.

Assume now that a terminating call to subscriber S011 is being made, and terminating junctor TJ1 is seized by ground appearing on lead ECO of line TJ1A from the selector. Relay 17S operates and at its contacts completes a path from negative battery through a 47,000-ohm resistor 1901, and contacts of relays 17S and others to lead P of line TJ1B. This potential extends to E matrix E1, through a pull winding and diode to conductor DE011P and thence to break contacts of relay LGH. If the marker is in sequence state S30, this signal is then extended via lead TC1 to the allotter 252, which causes operation of the line group relay LG. Signal LG is transmitted to the sequence circuit 291 to advance the sequence to state S29.

The signal LGH operates relay LGH during states S29, S1, and all terminating call states. The signal on lead DE011P is then extended through make contacts of relay LGH to the conductor TC1 to terminating selector 274. The terminating selector 274 supplies signal TC to the sequence circuits, to advance the sequence to state S1.

In state S1 the terminating selector 274 scans to find the E group having the terminating call. Since the call is in E matrix E1, coincidence occurs and the scanner stops, transmitting signal TJ to the sequence circuits. The sequence advances to state S14.

Ground on two of conductors CJK through contacts of relay LGH operates relay trees JK, JK′, 1GE, 2GE, 3GE and 4GE.

The fifteen vertical P conductors of E matrix E1 are then extended through relay tree 2GE to the leads EV1–EV15 which extend to the terminating selector 274.

The sequence and supervisory unit 290 removes ground from lead TH to relay AZ, during states S29, S1, S14, and the first four milliseconds of state S15; and supplies ground to operate relay AZ at all other times during the terminating call sequence. Therefore relay trees JK and JK′ do not lock at this time. The sequence remains in state S14 for sixteen milliseconds, and then advances to state S15.

The scanners of terminating selector 274, after four milliseconds now operate again to find a terminating junctor requesting service in the selected E group. Upon finding the call signal, which in this case is on lead EV1, the scanner stops and again transmits signal TJ to the sequence circuits. After four milliseconds in state S15, relay AZ operates, which locks the relay trees JK and JK′ when they operate after the completion of scanning to indicate the particular terminating junctor in the group and switch through corresponding leads.

Ground through contacts of relay AZ and relay trees JK′ and 1GE extends to the terminating junctor to operate the relay 17TJS. The tip and ring conductors of the communication path which have been extended from the sender through the originating junctor and the selector, are extended through contacts of relay 17TJS to leads TC and RC to the transceiver of the send receive circuit 280 (FIGS. 1, 6 and 9).

Control of the transceiver for receiving the called line number occurs during states S16, S17 and S18. The sequence circuit cycles through these three states for each transmission of two digits to the transceiver. A cycle counter whose output designates R states advances each time the sequence enters state S17. This counter is reset to R0 during state S15.

A signal ZR indicates that the shift register has all zeros, and is thus ready for information. The sequence advances to state (S16 R0).

A "pattern" of ones and zeros is now loaded into the terminating shift register of the send receive circuit 280, and a signal WUZ from gate 4207 indicates the correct loading thereof. The sequence advances to state (S17 R1).

The "pattern" is now transmitted by the transceiver to the sender in the register-sender group as an instruction to commence sending. A signal ZR indicates that the shift register has all zeros, meaning that sending is completed, and the sequence advances to state (S18 R1).

The hundreds and tens digits are now received by the transceiver into the shift register. When the prefix bit has been received, a signal PR is generated. The sequence advances to state (S19 R1).

The information from the shift register is loaded into a buffer store in send-receive circuit 280, and a signal HT from gate 4320 made true. The erase flip-flop ER is then set.

The shift register is erased and the signal ZR generated, causing the sequence to advance to state (S16 R1) and reset flip-flop ER.

The shift register is now loaded with a combination indicating "incomplete," after which a signal (INC+RESEND) from gate 4210 is true. The sequence advances to state S21.

The instruction "incomplete" is transmitted to the sender, with the end of the transmission indicated by signal ZR. The sequence is advanced to state (S18 R2).

The units and party digit are now received, causing the send-receive circuit to produce a signal UP. A signal PBX is true or false according to whether or not the call is to a PBX group. Assume that this is not a PBX call. The sequence advances to state S20.

The called line identification is now complete. We are assuming that the call is to line L011. Relays H0 and T1 were operated during state S19 R1, and relay U1 now operates, via signals on leads HT0, TT1, and UT1 from send-receive circuit 280. These relays return signals HX–0, TX–0, and UX–0 to the sequence circuits. Lead L011P is connected through relay tree LS thence through contacts of relay U1. This connection extends through contacts of relay HJ, a diode, a resistor 2811 to lead LD–0, for making the busy test.

*Called line idle*

If the called line is idle, negative 16 volts on lead LD–0 makes signal BSY false, and advances the sequence to state S21.

If one or more of the six AB links to the called line is idle, signal LNK is true, and the sequence is advanced to state S22.

The route search is now made in the same manner as in state S8 for an originating call, using the same route selector 271, except that instead of inputs J1–J20, D1–D20 are used. These leads extend to the horizontal "C" leads of E matrix E1, via relays LGH and relay tree 4GE; and are used to test the DE links. If a route is found signal OTR becomes true to advance the sequence to state S23.

The connection is now ready to be established. Relay drivers 2801 and 2802 are normally operated. Relay driver 2803 is operated during states S20 to S24 inclusive to disconnect the inputs of the units scanner at contacts of relay UP. Relay drivers 2807, 3150, 3554, and 3417 associated with leads LA, CDP, KKK and TPL operate now as we enter state S23. The pull path is established from negative battery through resistor 2804 and relay driver contacts, through contacts of relays U1 and LG, and relay tree LS to the horizontal P conductor of matrix A01 then through the pull windings of matrices A01 and B01 to the P conductor of link BC001, thence through the pull winding of matrix D1 to the conductor DE011P′. Negative battery at relay driver 3417 to lead TPL is also extended through relay trees JK and 2GE to the P conductor of the first vertical link of E matrix E1, thence through the pull winding and its associated diode to lead DE011P. The two leads DE011P and DE011P′ are extended through relay trees 3GE and LU to ground at contacts of relay driver 3150. The crosspoints then operate in matrices A01, B01, and D1 in series; and also in matrix E1 to establish the path. The path is held by ground on the C lead and a terminating junctor via line TJ1B and the hold windings of the four matrices E1, D1, B01, and A01, and the cutoff relay of line circuit LC011 in series.

A code designating the party, or other information regarding the call, is transmitted from the send receive circuit 280 via leads A, B, C and D to the terminating junctor.

Operation of the cutoff relay extends ground from lead BCO to the pull lead L011P, which is connected to lead LD–0. This makes signal BSY true, advances the sequence to state S24, and sets flip-flop ER.

The terminating shift register of send-receive circuit 280 is erased and signal ZR becomes true. The sequence is advanced to state (S16 R2) and ER is reset.

An instruction "idle" is loaded into the shift register, making ZR false. The sequence advances to state (S17 R3).

The instruction "idle" is transmitted to the sender, and ZR becomes true. The sequence advances to state S29.

The locking relays operate to release the marker, as on an originating call.

*Called number designates PBX group*

A call to a PBX group proceeds as other terminating calls until the called number is completely received in state (S18 R2); and the send-receive circuit generates signal PBX. The sequence then enters state S25.

Figure 15:
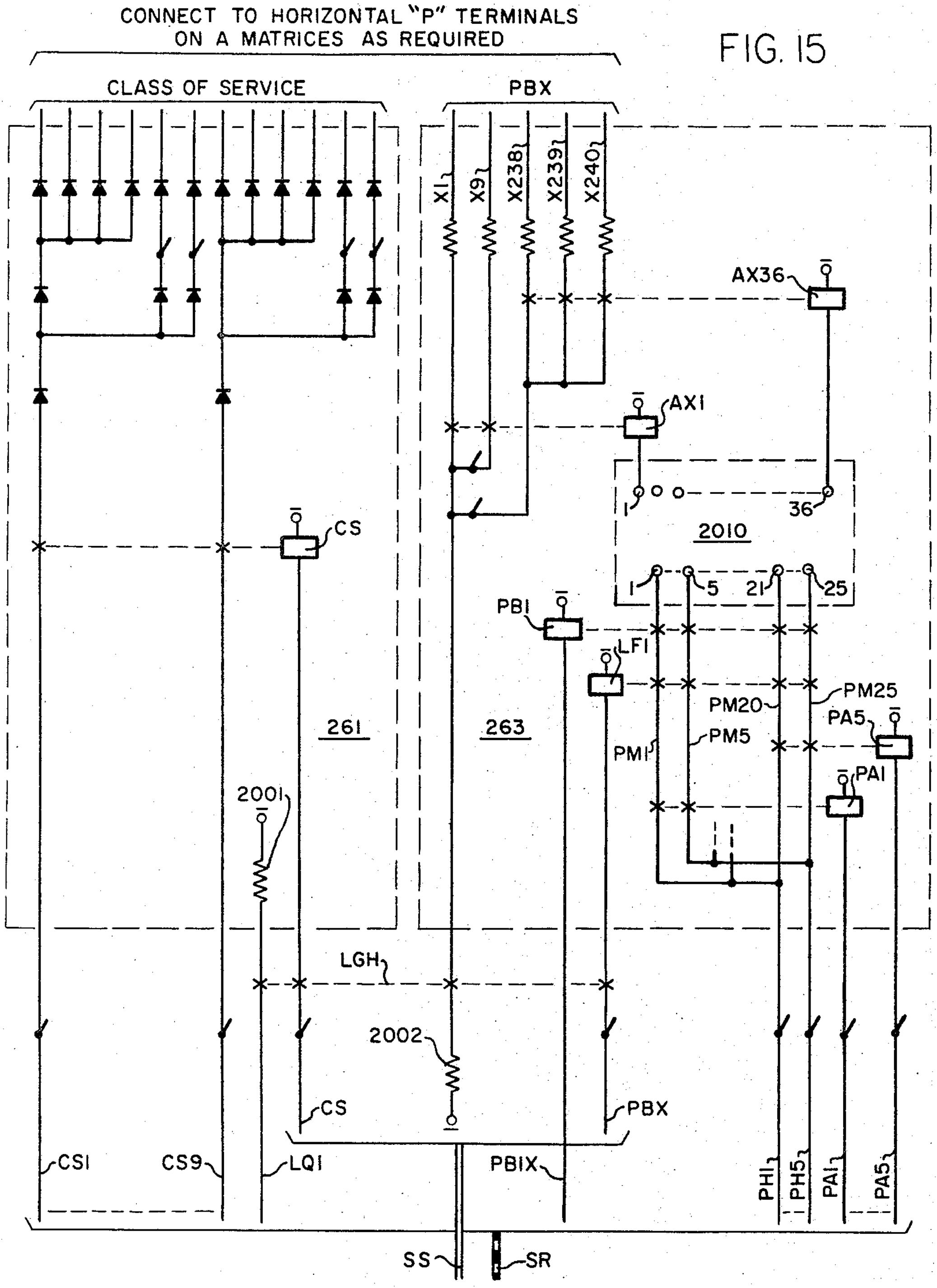
FIG. 15 is a schematic drawing of the class-of-service and PBX marking units.

The PBX group circuits 263 shown in detail in FIG. 15 are now used. An arrangement is provided for placing negative potential on the horizontal P conductors of all of the idle line circuits of a group. A jumper field having input leads through contacts of a relay PB1, and output leads to thirty-six relays AX1–AX36 is provided. If additional facilities are required, one or two additional jumper fields with inputs through contacts of respective relays PB2 and PB3 (not shown) and their own output grouping relays may be provided. For each PBX group one of the twenty-five input terminals of jumper field 2010 is used and is jumpered to one or more of the thirty-six output terminals. Each of the relays AX1–AX36 may have a number of contacts, for example relay AX1 has nine contacts connected through respective resistors to the leads X1–X9, and relay AX36 has three contacts extending through respective resistors to the leads X238–X240. Negative battery potential is applied to all of these contacts through a resistor 2002 and contacts of relay LGH. The P conductors of the line circuits are connected from the horizontal P terminals of the A matrices to respective ones of the conductors X1–X240 as required to provide the PBX grouping. The called number code for the PBX group includes a signal on lead PB1X which through contacts of relay LF1 operates relay PB1, or a signal on a corresponding one the other leads (not shown) to operate a corresponding relay, for the other jumper fields. A signal on one of the leads PA1–PA5 operates one of the relays PA1–PA5; and a signal on one of the leads PH1–PH5 is extended through the contacts of the operated last mentioned relay to one of the conductors PM1–PM25 thence through contacts of relay LF1 and relay PA1 and through the jumper field 2010 to operate the relay or relays for that PBX group. The negative potential from resistor 2002 is now connected to the P leads at the line circuits of all lines of the group. However for busy lines of the group, the P lead is maintained at ground potential through contacts of the cutoff relay to lead BCO. For the idle lines, the negative potential on the P lead appears to be an originating call request, and signal OC is generated in the allotter, in the same manner as explained at the beginning of an originating call. The sequence and supervisory circuit 290 places ground on lead LR in states S25 and S28 inclusive, and operates relay LR to disconnect negative potential from lead LR1, and substitute ground potential which makes lines having actual call requests look busy.

The line identifier scanners 2903, 2902 and 2901 are reset respectively to hundreds digit "1," tens digit "1," and units digit "1." After a wait of 16 milliseconds the signal OC advances the sequence to S26.

In states S26, S27 and S28 the line identifier operates in the same manner as in states S3, S5 and S7 to identify hundreds, tens and units.

There is now operated one of relays 29H1–29H0, one of relays 29T1–29T0, and one of relays 28U1–28U0;

identifying the selected idle line of PBX group. The call now proceeds as for other terminating calls.

While relays PA1–PA5 are shown individual to a line group in unit 263, they could be common equipment in each marker, in which case the leads PM1–PM25 would be connected in multiple to the ten line groups.

*Busy conditions*

On either an ordinary or a PBX call, various busy conditions or link blockages can occur. In each such instance the erase flip-flop ER is set, and the sequence advanced to state S16. On a PBX call the overflow flip-flop PX0 is first set.

In each case an instruction is loaded in state S16 R2 into the terminating shift-register and transmitted in state S17 R3 to the sender in the register-sender group. In state S20 the called line itself is tested and the signal BSY indicates that it is busy; so the instruction transmitted indicates "busy." In state S21 the signal $\overline{\text{LNK}}$ means that all AB links to the called line A matrix are busy and therefore no route is possible; so the instruction transmitted indicates "trunk busy." In state S22 the signal $\overline{\text{OTR}}$ means that no route is available between the particular terminating junctor and the called line, but there may be one from another terminating junctor; so the instruction is "resend." This causes the sender to make a new attempt to complete the call.

In states S25 and S26 the signal $\overline{\text{OC}}$ means that there is no idle line in the PBX group, which causes a flip-flop PX0 (not shown) in the sequence and supervisory unit 290 to be set to record the overflow condition, and a flip-flop ER (not shown) is set in response to the signal PX0. The instruction transmitted is "busy."

In each case the marker releases after the instruction is transmitted.

CLASS OF SERVICE

The arrangement for supplying class of service information along with the line identification information from the marker to the register during states S9, S10 and S11 is described above as part of the operation for an originating call. The diode field 261 is shown in FIG. 15. Each line circuit has its P conductor connected via diodes and contacts of relay CS to certain of the nine conductors CS1–CS9 according to its class of service. One class of service has no connection to these conductors, there are nine classes represented respectively by a connection to a single conductor, and other classes are represented by connections to combinations of from two up to all nine conductors. Conductors CS1–CS9 extend via cable SR to the LNI encoder 4010 in FIG. 8, of the send-receive circuit 280.

Operation of relay LGH extends the signal CS from the sequence and supervisory circuits via cable SS to operate relay CS.

A resistor 2001 supplies a negative potential via lead LQ1 to identify the first line group. The other conductors LQ2–LQ0 to the LNI encoder 4010 in FIG. 8 are from the other nine line groups respectively.

While the principles of the invention have been described in connection with specific apparatus, it is to be clearly understood that this description is made only by way of example and not as a limitation to the scope of the invention.

What is claimed is:

1. In a communication switching system having a switching network for establishing connections between any one of a plurality of line circuits connected to a line side of the network and any one of a plurality of originating terminals on the other side of the network, control means which responsive to a call-request signal condition at one of said line circuits controls the finding of a path and the establishment of a connection through said network from said line circuit to one of the originating terminals;

a class of service arrangement comprising a plurality of common conductors, a network of unidirectional devices connecting at least some of said line circuits to certain of said conductors, said connections being completed from any line circuit to said conductors in accordance with the class of service given to the line, signal register means coupled to said conductors, means effective during a given period of time to apply a class-of-service marking potential via said network of unidirectional devices to mark the conductors connected to said calling line circuit, and means effective during said given period to receive the marking potentials and store in said signal register means information designating the class of service of said calling line in accordance with the markings on said conductors.

2. In a communication switching system, the combination as claimed in claim 1, wherein said signal register means comprises a plurality of bistable devices coupled to said common conductors of the class of service arrangement.

3. In a communication switching system, the combination as claimed in claim 1, wherein said control means includes a marker which to establish said connection applies operate marking potentials to an operate conductor of the switching network, wherein said network of unidirectional devices is connected to said operate conductor of the line-circuits, and wherein said class-of-service marking potential is also applied to said operate conductor at said calling line circuit being served by the marker during said given period of time.

4. In a communication switching system, the combination as claimed in claim 3, further including a signaling arrangement to transmit said class-of-service information from the signal register means to other equipment.

5. In a communication switching system, the combination as claimed in claim 4, in which said other equipment comprises call register apparatus accessed from the switching network via said originating terminals, and wherein said marker includes line identification apparatus having connections to said signal register means, and wherein the line identification along with the class-of-service designation from said class-of-service conductors is transmitted via said signaling arrangment to the call register apparatus for storage.

6. In a communication switching system, the combination as claimed in claim 5, wherein said marker includes a relay tree arrangement from said operate conductors at the line side of said network to a common marking conductor, said class-of-service marking potential being applied during said given period to said common marking conductor and via said relay tree to the operate conductor at the line side of the network for the particular line being served by the marker, and wherein said operate marking potential is supplied at said common marking conductor via said same relay tree to said operate conductor at the line side of the network for that line during the establishment of said connection through the switching network to the selected originating terminal to the call register apparatus.

7. In a communication switching system, the combination as claimed in claim 6, wherein said relay tree is also used in connection between said operate conductor at the line side of the network to said line identification apparatus during the identification of the line being served.

8. In a communication switching system, having a switching network for selectively establishing connections between any one of a plurality of terminating junctors and any one of a plurality of lines under the control of a marker, and having an arrangement associated with each line effective in response to the line being busy to apply a given polarity potential to a given conductor of the line terminal at the line side of the network, an arrangement in the marker effective when attempting to establish a connection from a terminating junctor to a designated called line for testing the given conductor at the line terminal of that line so that normally in response to a test indicating the presence of said given polarity potential indicating that the line is busy the connection is not established;

means effective during a special type call to remove said given polarity potential from the control conductor at the line side of the network so that a connection from the terminating junctor to that line can be established even though it is busy.

References Cited

UNITED STATES PATENTS

| | | | |
|---|---|---|---|
| 3,102,930 | 9/1963 | Anderson et al. ---- | 179—18.61 |
| 3,106,615 | 10/1963 | Spjeldnes ---------- | 179—18.7 |
| 3,211,837 | 10/1965 | Bruglemans ------- | 179—18.61 |
| 3,221,107 | 11/1965 | Seeman et al. ------ | 179—18.81 |
| 3,231,680 | 1/1966 | Yamato et al. ----- | 179—18.61 |

KATHLEEN H. CLAFFY, *Primary Examiner.*

L. A. WRIGHT, *Assistant Examiner.*